(12) United States Patent
Zhou et al.

(10) Patent No.: US 7,481,608 B2
(45) Date of Patent: Jan. 27, 2009

(54) ROTATABLE CHUCK

(75) Inventors: Jin Lin Zhou, Wuhan (CN); Xian Guo Zhao, Changde (CN); Chin Hung Lam, Shatin (HK); Zhi Qin Cui, Henan Province (CN); Koon For Chung, Sai Kung (HK)

(73) Assignee: Eastway Fair Company Limited, Tortola (VG)

( * ) Notice: Subject to any disclaimer, the term of this patent is extended or adjusted under 35 U.S.C. 154(b) by 420 days.

(21) Appl. No.: 11/253,535

(22) Filed: Oct. 19, 2005

(65) Prior Publication Data

US 2006/0244224 A1   Nov. 2, 2006

Related U.S. Application Data

(63) Continuation-in-part of application No. 11/116,127, filed on Apr. 27, 2005.

(51) Int. Cl.
*B23B 31/163* (2006.01)

(52) U.S. Cl. .................. 408/240; 279/62; 279/134; 279/140

(58) Field of Classification Search .............. 408/240; 279/60–62, 134, 140; *B23B 31/163*
See application file for complete search history.

(56) References Cited

U.S. PATENT DOCUMENTS

| | | | |
|---|---|---|---|
| 2,684,856 A | 7/1954 | Stoner | 279/61 |
| 3,834,252 A * | 9/1974 | Abell et al. | 81/475 |
| 4,277,074 A | 7/1981 | Kilberis | 279/60 |
| 4,317,578 A | 3/1982 | Welch | 279/60 |
| 4,323,324 A | 4/1982 | Eberhardt | 408/124 |
| 4,395,170 A | 7/1983 | Clarey | 408/241 |
| 4,498,682 A | 2/1985 | Glore | 279/1 K |
| 4,526,497 A * | 7/1985 | Hatfield | 408/240 |
| 4,669,932 A | 6/1987 | Hartley | 408/239 |
| 4,682,918 A | 7/1987 | Palm | 408/241 |
| 4,840,387 A | 6/1989 | McCarthy | 279/1 |
| 4,848,779 A | 7/1989 | Wheeler et al. | 279/60 |
| 4,915,555 A | 4/1990 | Smothers | 279/60 |
| 4,951,955 A | 8/1990 | Sakamaki | 279/62 |
| 5,195,760 A | 3/1993 | Wheeler | 279/60 |
| 5,197,749 A * | 3/1993 | Moore et al. | 279/147 |
| 5,232,230 A | 8/1993 | Lin | 279/62 |
| 5,348,318 A | 9/1994 | Steadings et al. | 279/62 |
| 5,407,215 A | 4/1995 | Yang | 279/64 |
| 5,908,076 A * | 6/1999 | Marcengill et al. | 173/93 |
| 5,957,469 A | 9/1999 | Miles et al. | 279/62 |

(Continued)

*Primary Examiner*—David P Bryant
*Assistant Examiner*—Eric A Gates
(74) *Attorney, Agent, or Firm*—Michael Best & Friedrich LLP

(57) ABSTRACT

A chuck is provided with a body, a plurality of jaws and an adjustment ring. The adjustment ring is threadably engaged with the jaws. When the adjustment ring is rotated in one direction, the jaws tighten by moving closer to each other. When the adjustment ring is rotated in the opposite direction, the jaws loosen by moving away from each other. An impact member is also provided for engagement with the adjustment ring. When the drive shaft of the power tool is rotated, the adjustment ring impacts against the impact member. As a result, the adjustment ring and the body of the chuck rotate relative to each other causing the jaws of the chuck to loosen or tighten depending on the direction the drive shaft is rotating.

22 Claims, 26 Drawing Sheets

U.S. PATENT DOCUMENTS

| | | | |
|---|---|---|---|
| 5,988,653 A | 11/1999 | Kuo | 279/62 |
| 5,992,859 A | 11/1999 | Lin | 279/62 |
| 6,045,303 A | 4/2000 | Chung | 408/124 |
| 6,073,939 A | 6/2000 | Steadings et al. | 279/62 |
| 6,179,301 B1 | 1/2001 | Steadings et al. | 279/62 |
| 6,182,978 B1 | 2/2001 | Hsueh | 279/62 |
| 6,196,554 B1 | 3/2001 | Gaddis et al. | 279/63 |
| 6,241,260 B1 | 6/2001 | Judge et al. | 279/64 |
| 6,247,706 B1 | 6/2001 | Kuo | 279/62 |
| 6,257,596 B1 | 7/2001 | Yang | 279/62 |
| 6,390,481 B1 * | 5/2002 | Nakamuro | 279/62 |
| 6,435,521 B2 | 8/2002 | Steadings et al. | 279/62 |
| 6,488,286 B2 | 12/2002 | Yaksich | 279/62 |
| 6,488,287 B2 | 12/2002 | Gaddis et al. | 279/63 |
| 6,513,604 B2 * | 2/2003 | Hanke | 173/48 |
| 6,517,295 B2 | 2/2003 | Lin | 408/16 |
| 6,729,812 B2 | 5/2004 | Yaksich et al. | 408/240 |
| 6,832,764 B2 | 12/2004 | Steadings et al. | 279/62 |
| 6,834,864 B2 | 12/2004 | Girardeau | 279/60 |
| 6,843,484 B2 | 1/2005 | Schroeder | 279/60 |
| 6,843,485 B2 | 1/2005 | Sakamaki et al. | 279/62 |
| 6,860,488 B2 | 3/2005 | Mack | 279/62 |
| 7,008,151 B2 | 3/2006 | Yaksich et al. | 408/240 |
| 7,018,146 B2 | 3/2006 | Barton et al. | 408/240 |
| 2004/0251641 A1 | 12/2004 | Hoffmann et al. | 279/62 |
| 2005/0023774 A1 | 2/2005 | Mack | 279/60 |

* cited by examiner

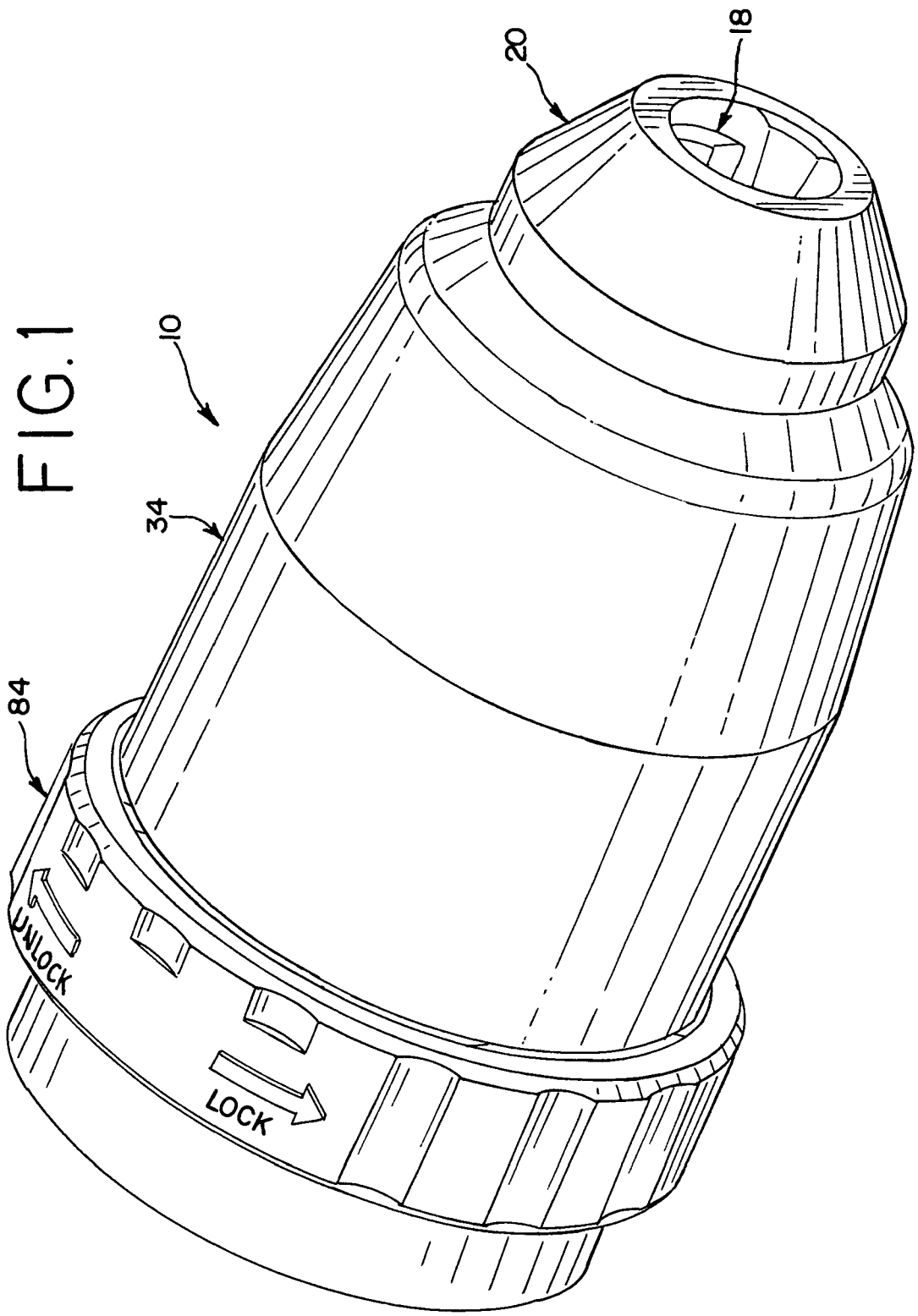

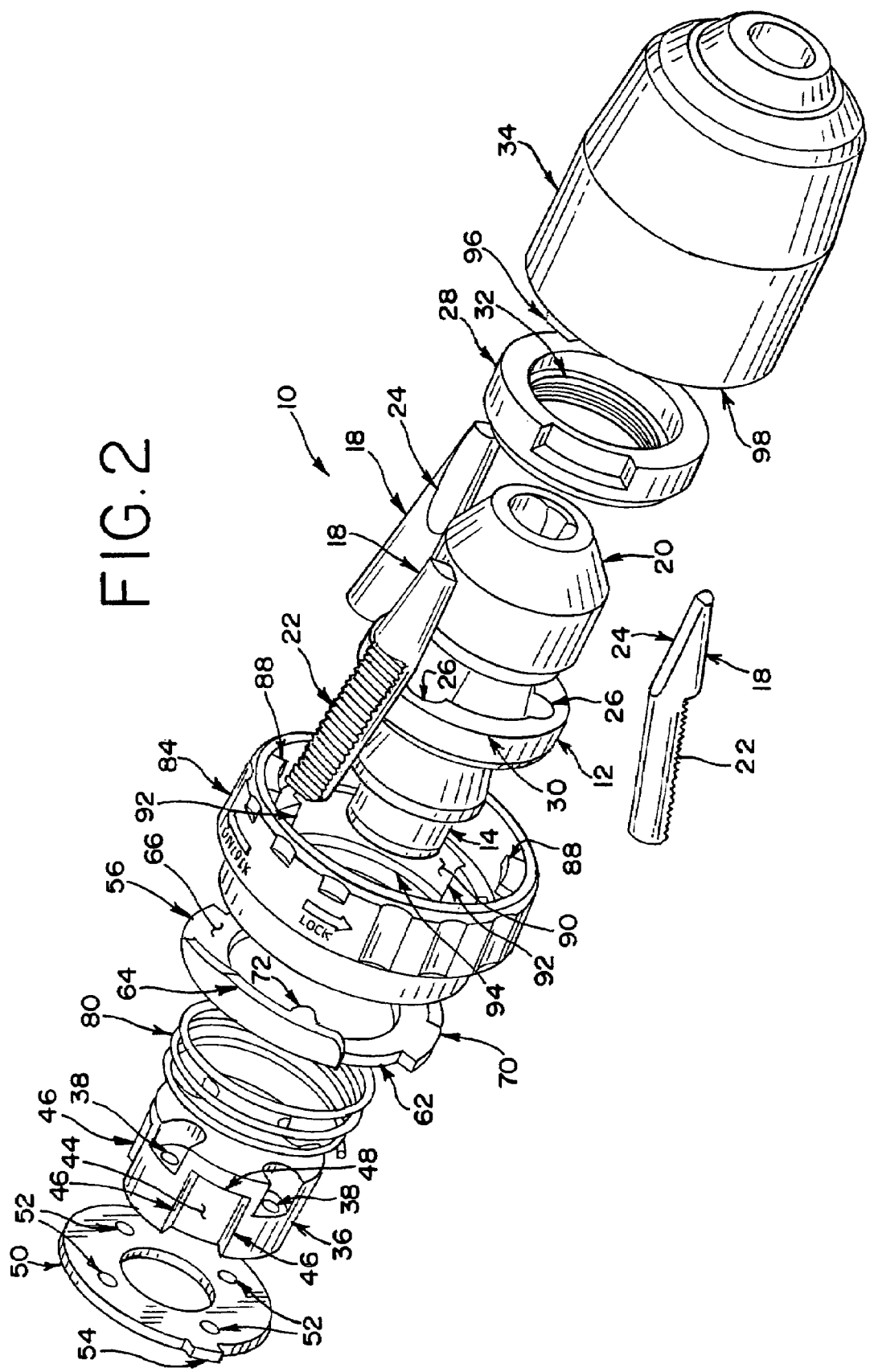

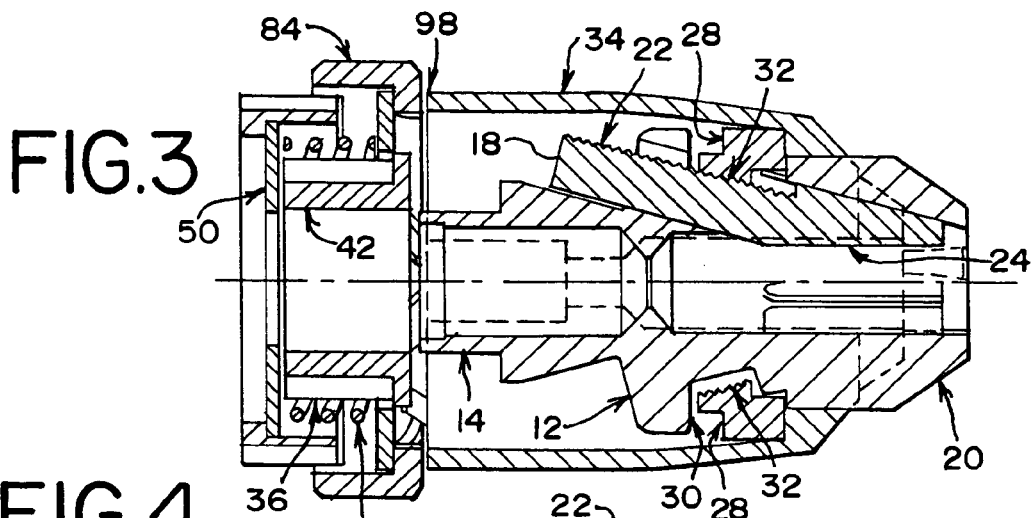
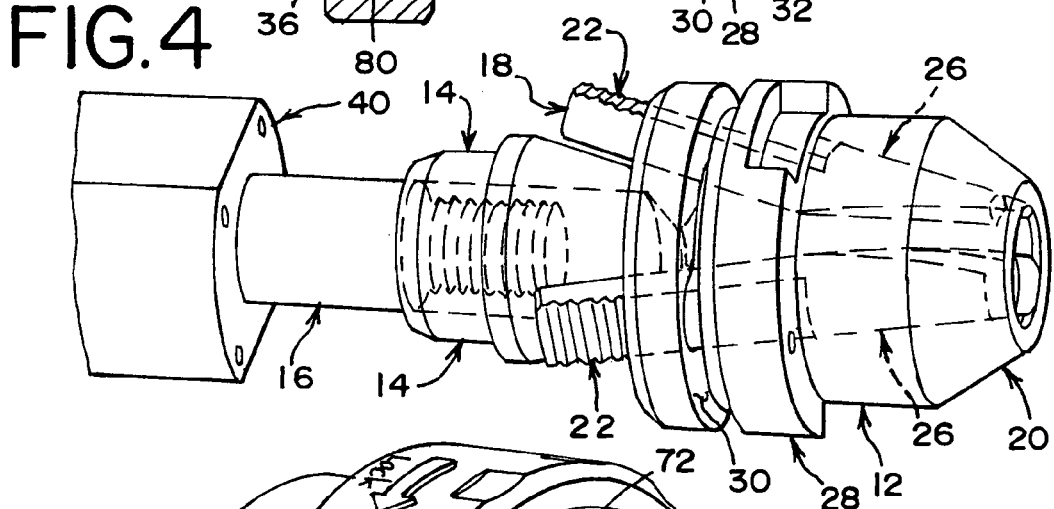
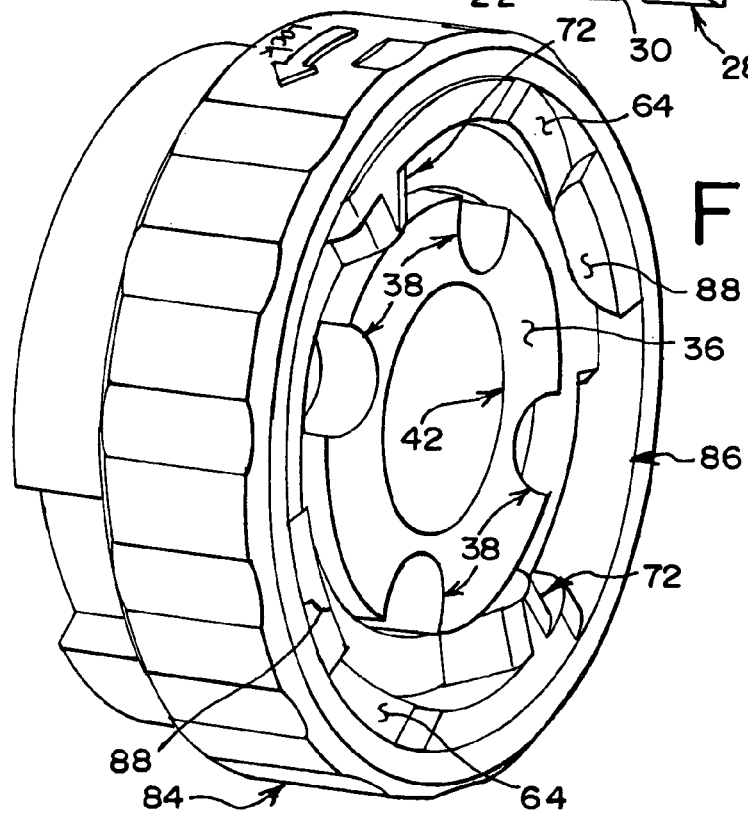

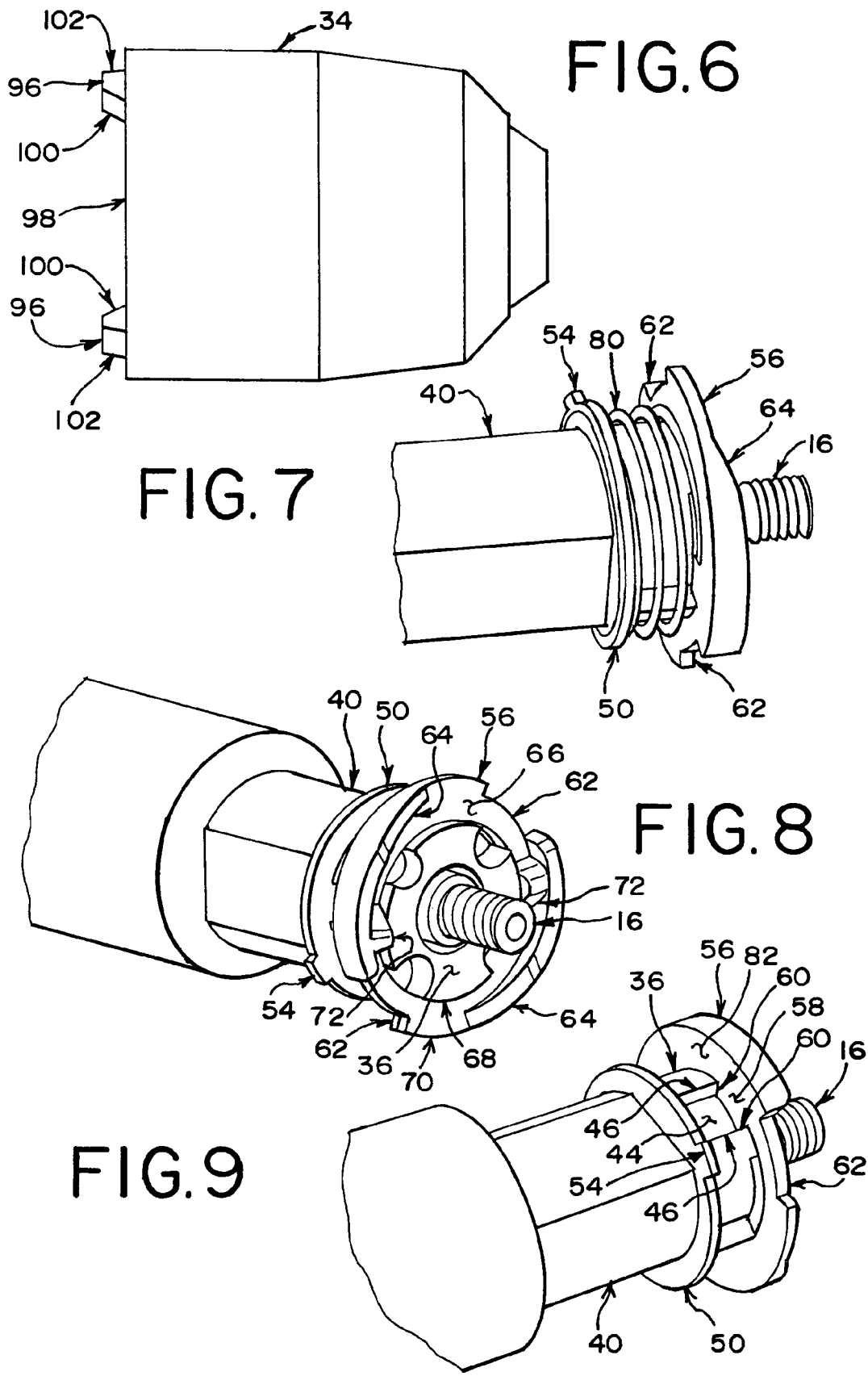

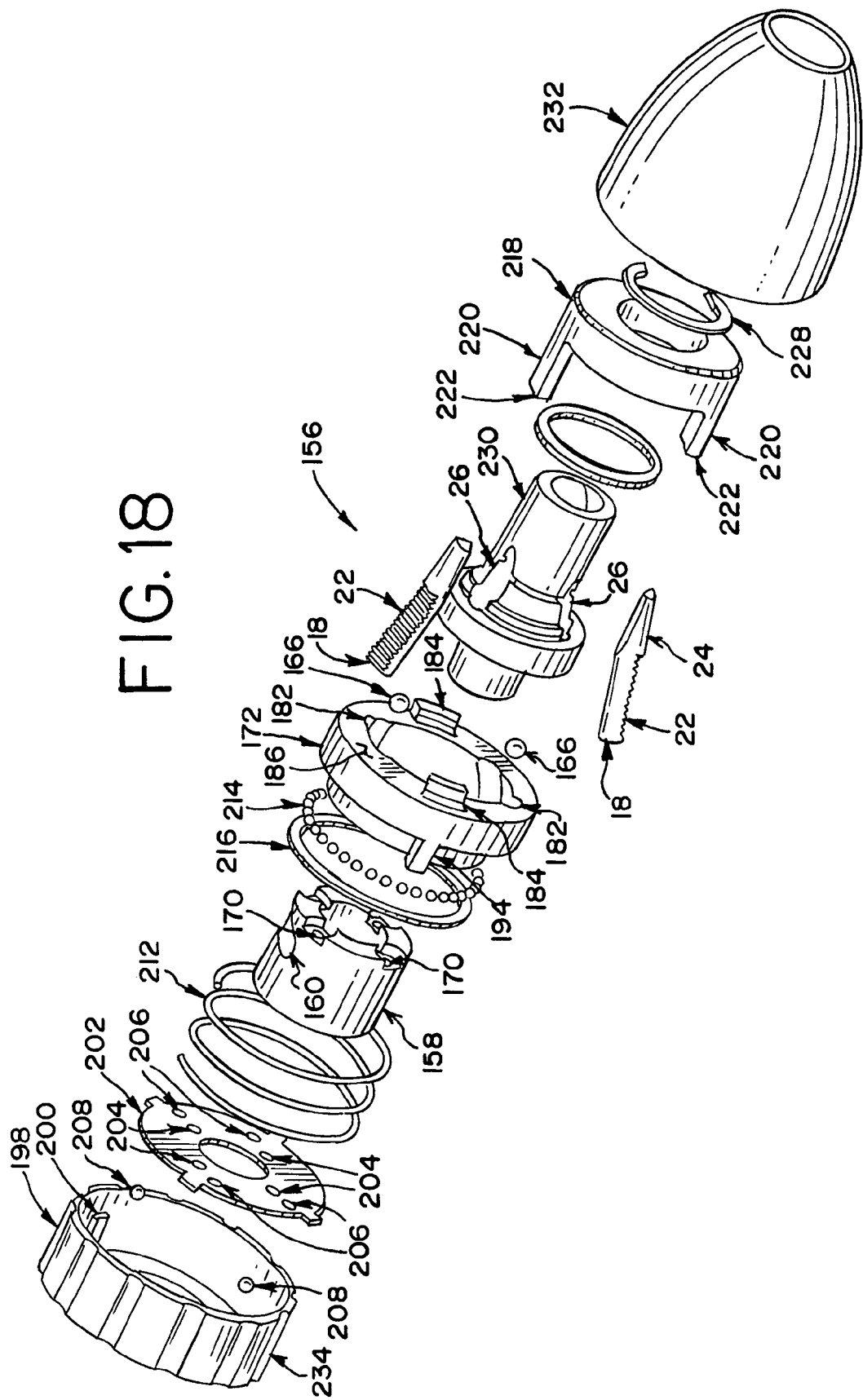

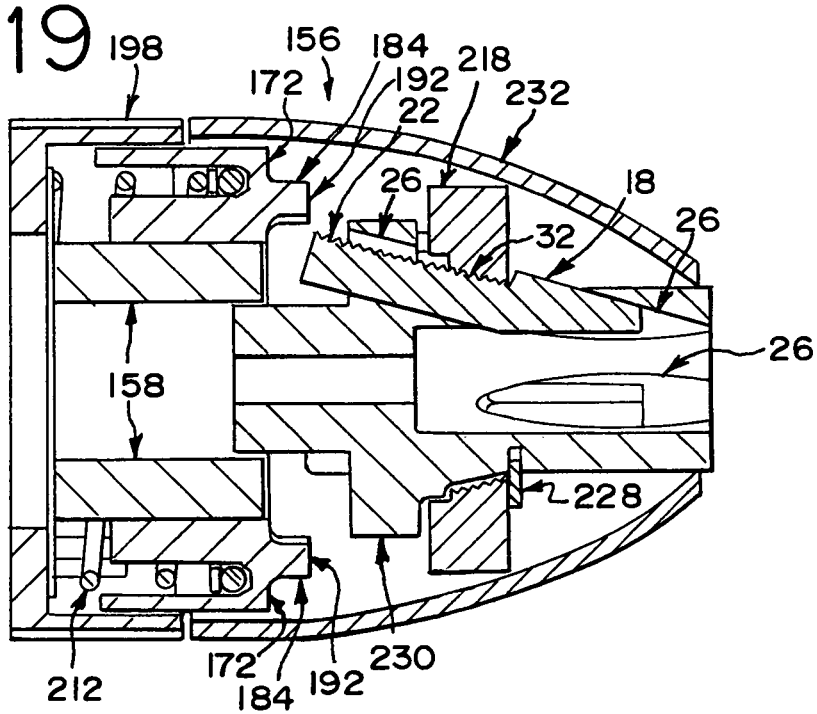
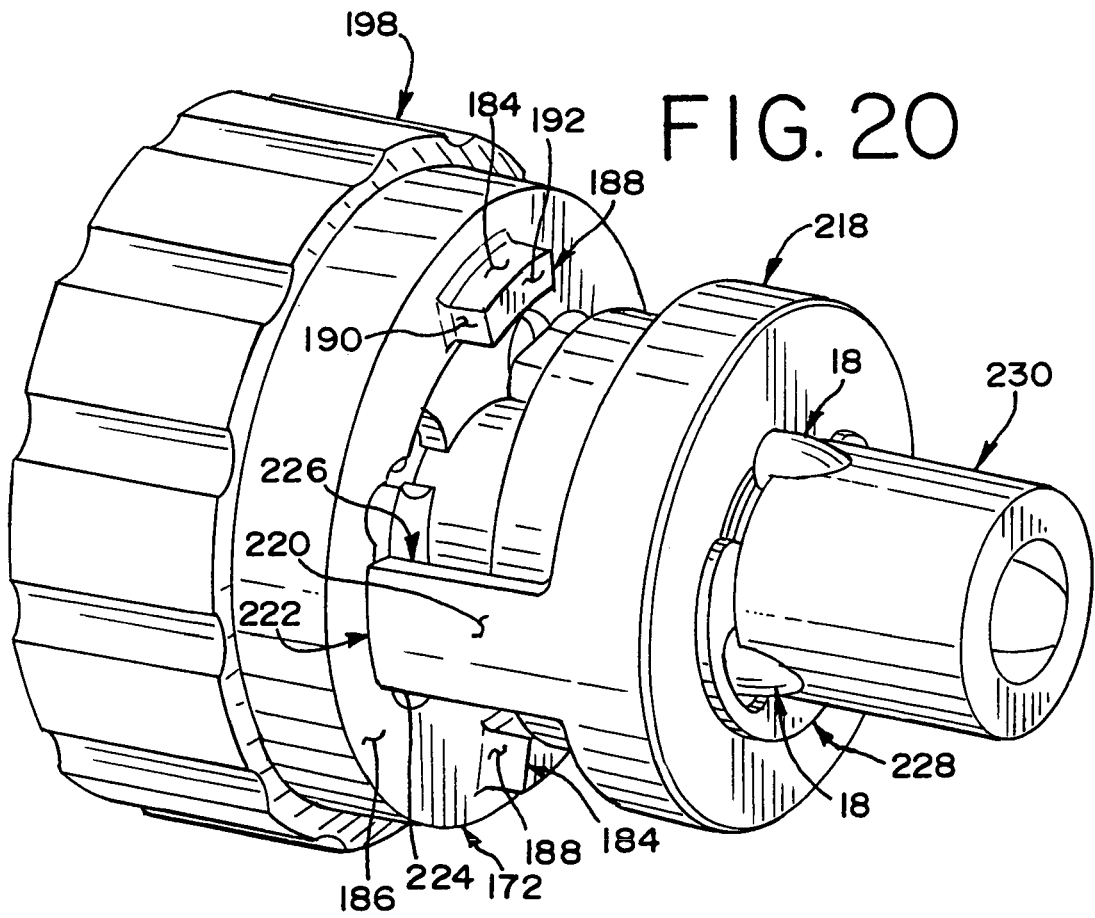

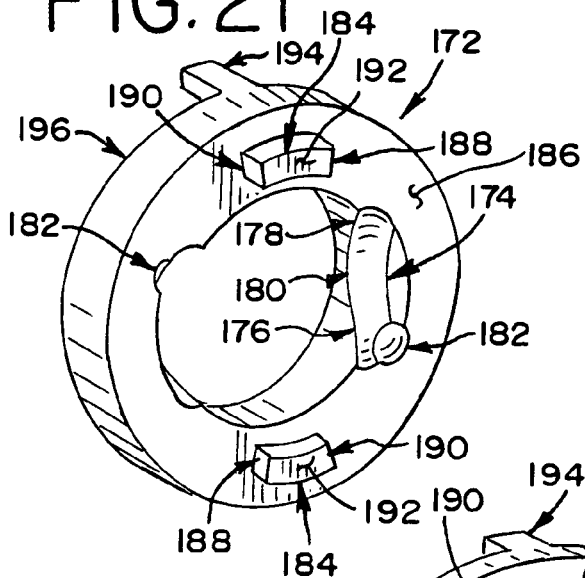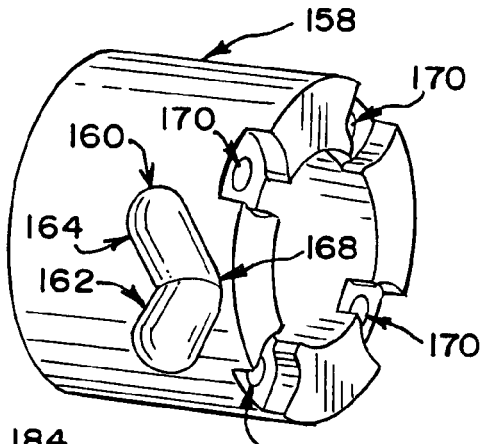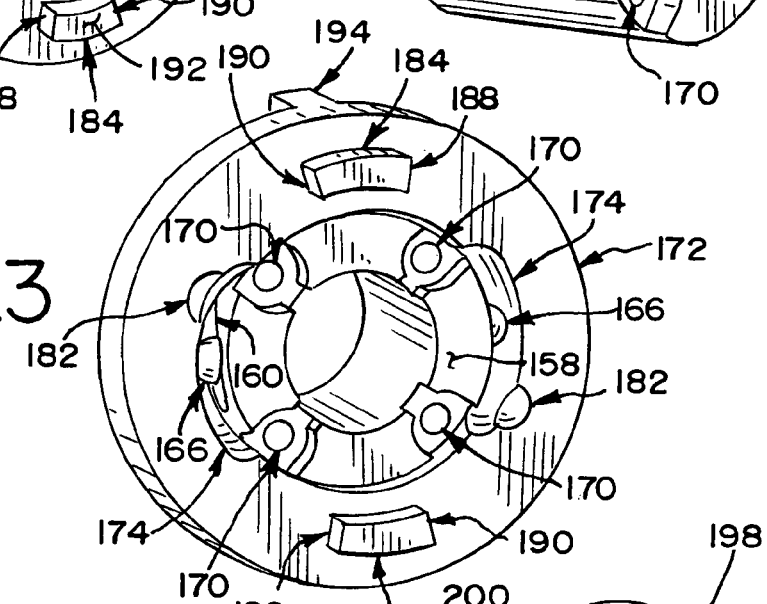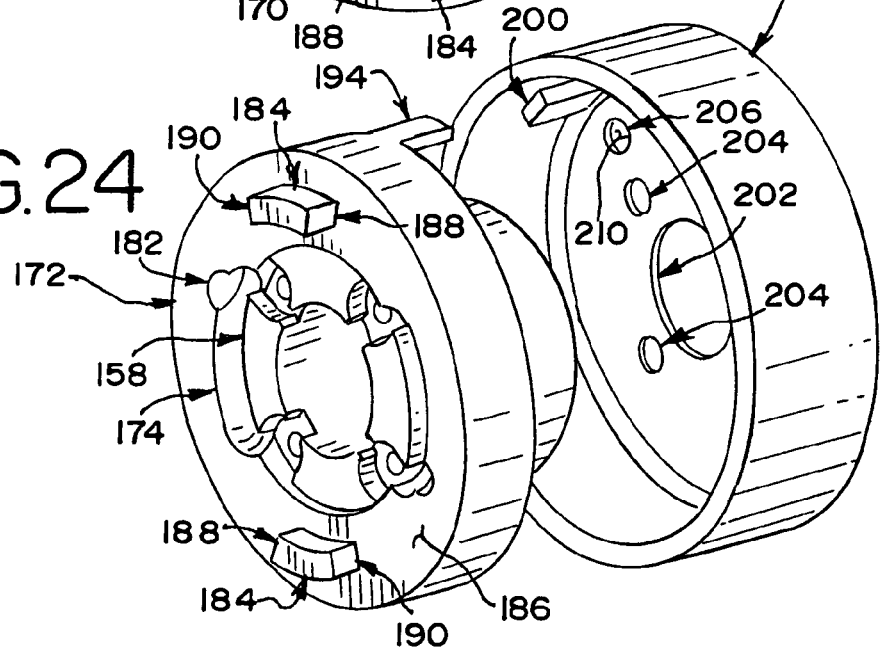

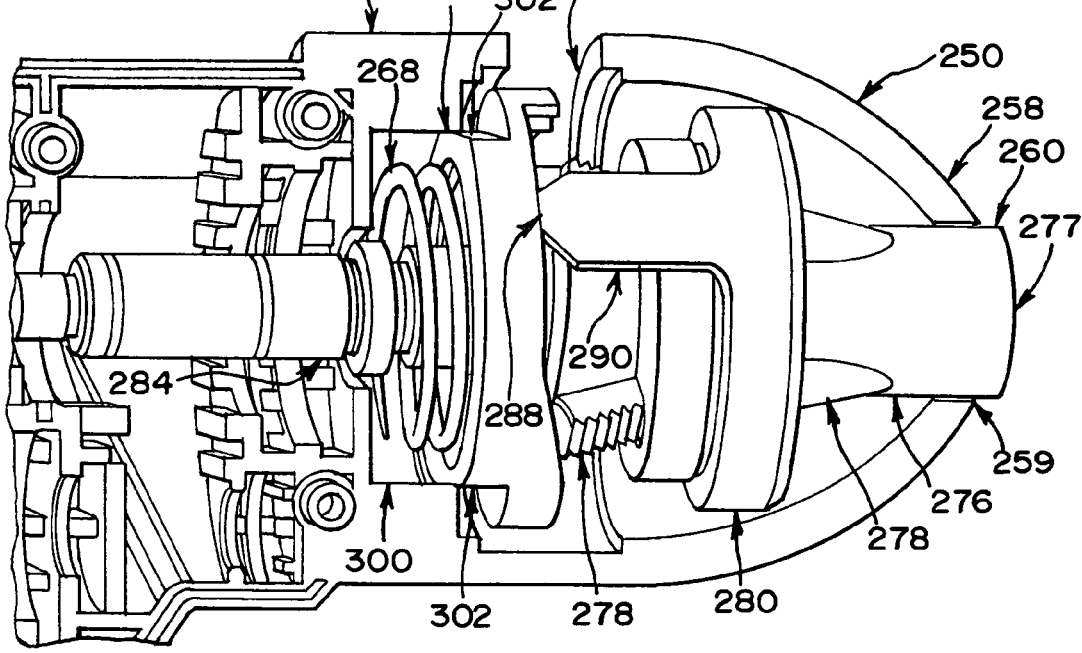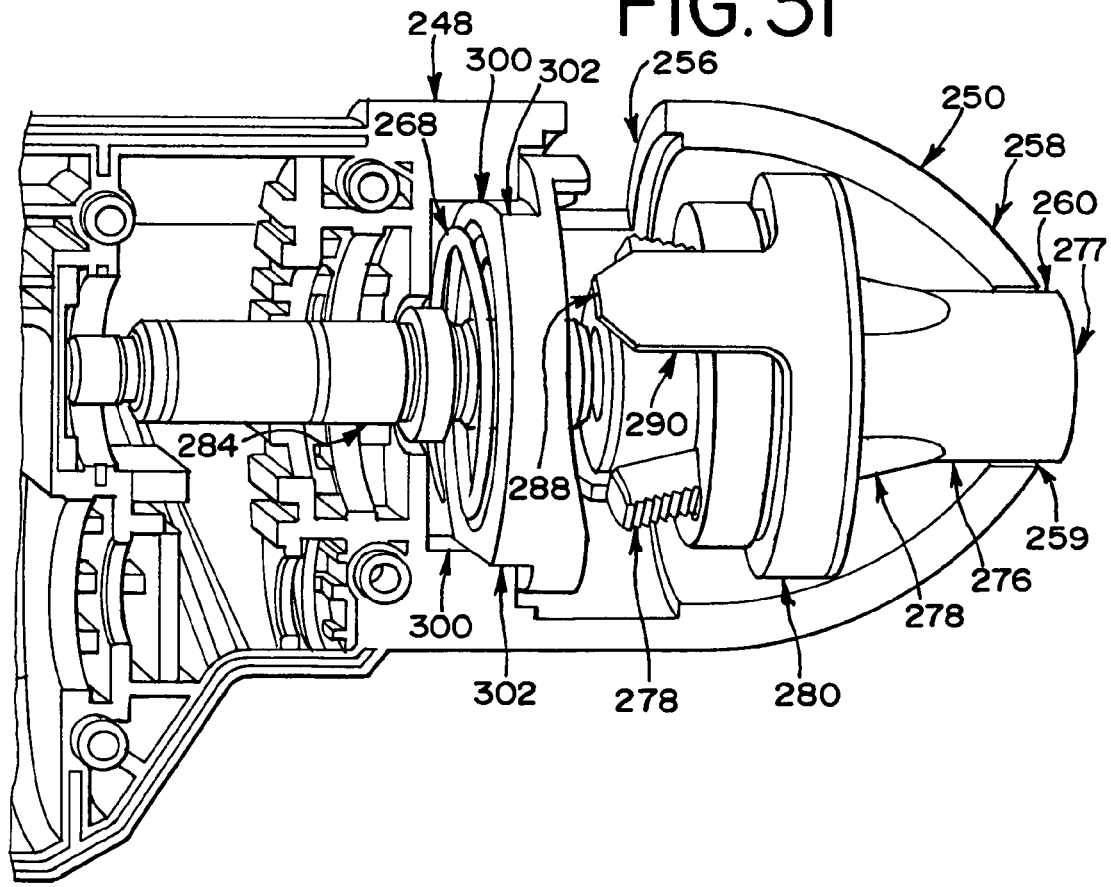

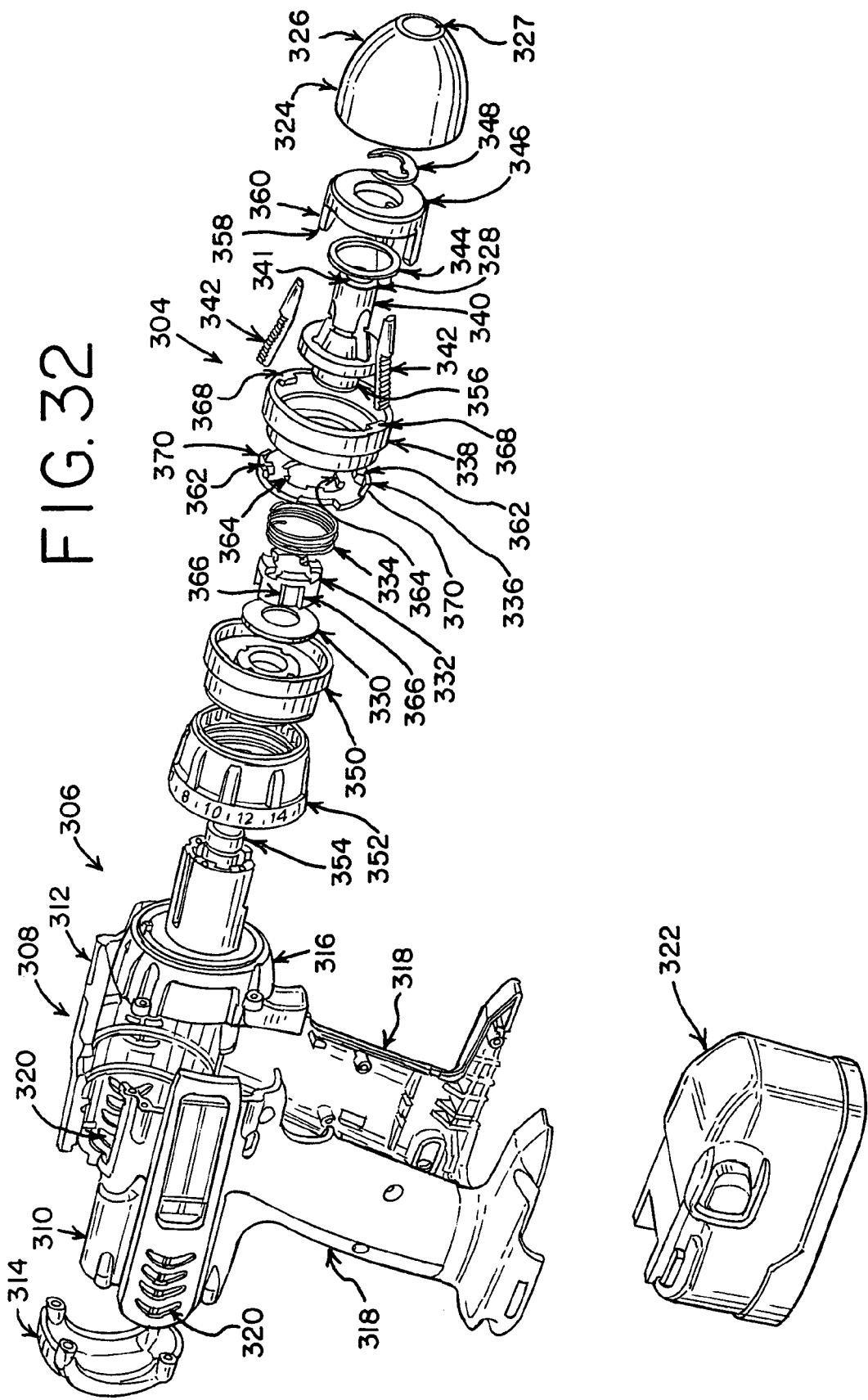

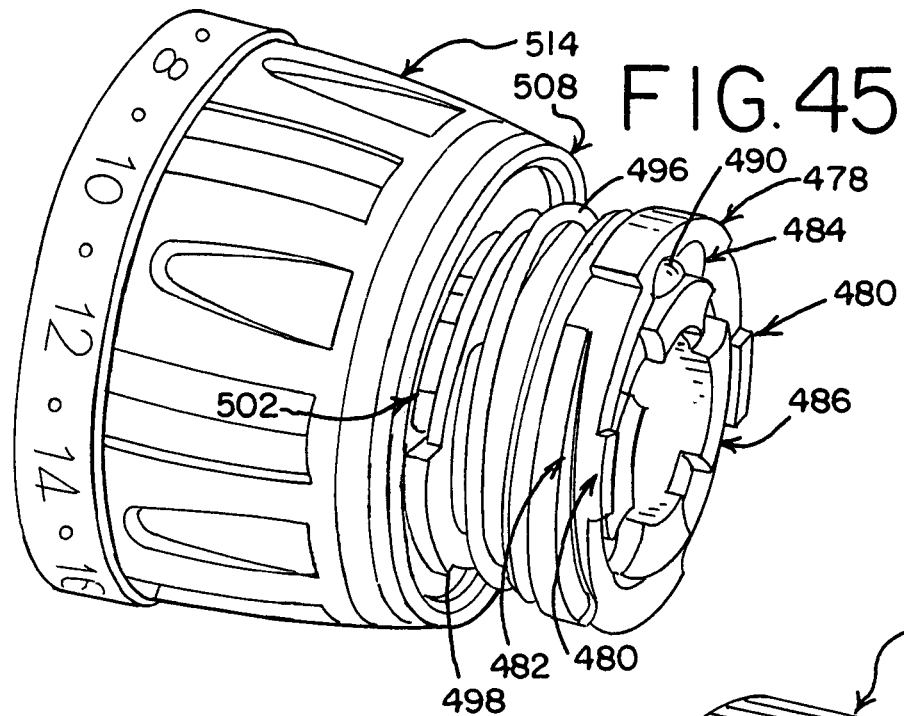
FIG. 45
FIG. 46
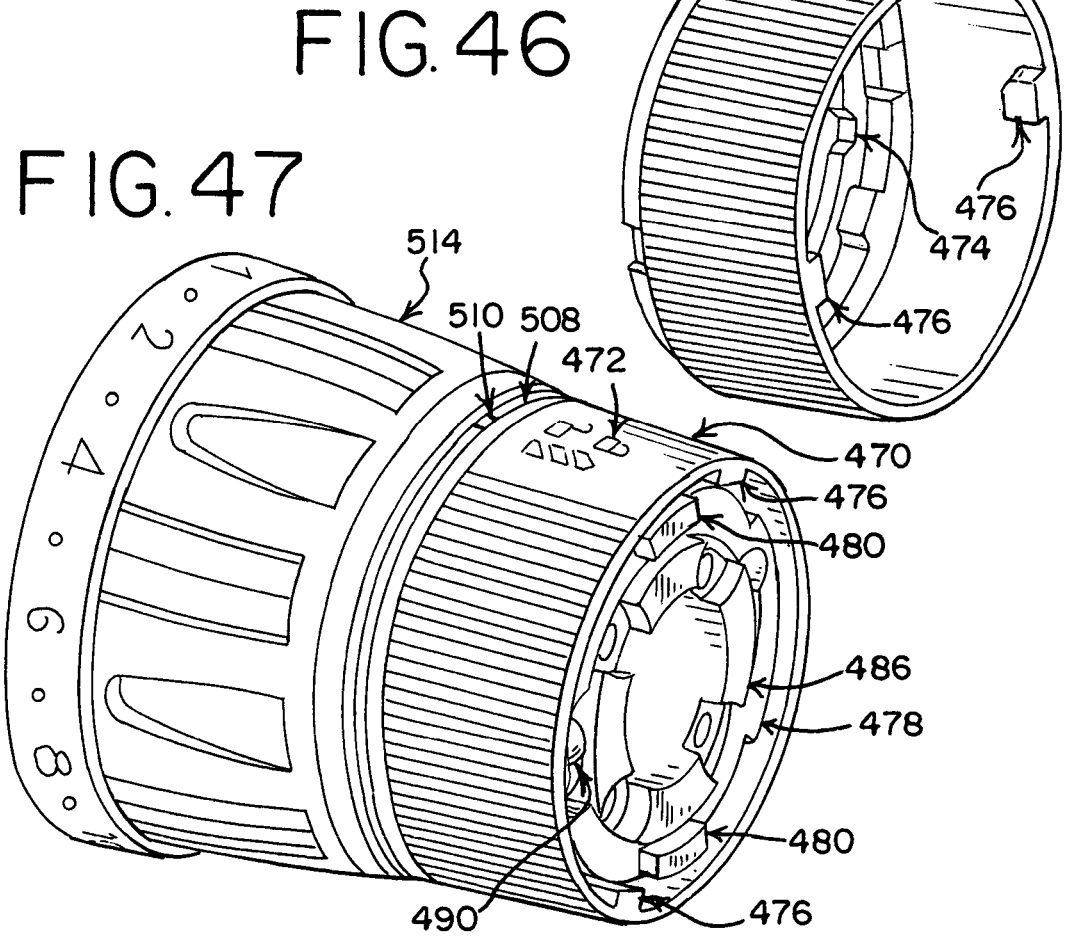
FIG. 47

ROTATABLE CHUCK

This is a continuation-in-part of U.S. patent application Ser. No. 11/116,127, filed Apr. 27, 2005, which is hereby incorporated by reference herein.

BACKGROUND

The present invention relates generally to chucks and more particularly to a chuck that may be locked or unlocked by rotating the drive shaft of a power tool.

Chucks are well known and are used in many applications. In general, a chuck is connected to the drive shaft of a power tool. One common example of the type of power tool that a chuck may be used on is an electric drill. However, chucks are also used on numerous other tools, such as screw drivers, nut drivers and grinders. Moreover, power tools may be powered by pneumatics, electricity, manual power or by other power sources. Chucks are generally used to grip the shaft of various work tools so that the work tool rotates with the drive shaft of the power tool. Typical types of work tools that may be used with a chuck include drill bits, screwdriver bits and grinding disks or stones.

A wide variety of chucks have been developed. The most common type of chuck that is employed uses three jaws to grip the shaft of a work tool. These types of chucks are able to securely grip shafts with both round and polygonal cross-sections. Typically, the jaws move towards each other in a smaller diametrical relationship as the chuck is tightened and move away from each other in a larger diametrical relationship as the chuck is loosened. Most chucks are designed so that the jaws have a relatively large range of movement. This allows a single chuck to grip many different work tools with different sized shafts.

Typically, chucks also have an adjustment mechanism that is used to tighten and loosen the jaws. Conventional adjustment mechanisms include an adjustment ring that is threaded to the jaws. Thus, when the adjustment ring is rotated, the threaded engagement between the adjustment ring and the jaws causes the jaws to move toward each other or away from each other depending on the direction the adjustment ring is rotated. Commonly, an outer sleeve that the user may operate by hand is provided which is fixedly attached to the adjustment ring. As a result, when the user rotates the outer sleeve in one direction, the jaws move towards each other in a tightening direction. Likewise, when the user rotates the outer sleeve in the opposite direction, the jaws move away from each other in a loosening direction. Other types of engagement structures may also be used. For example, some chucks use a key to rotate a sleeve that is fixedly attached to the adjustment ring. Typically in these chucks, the key engages a ring gear on the sleeve while being radially fixed to the body of the chuck. As a result, the sleeve rotates and threadably moves the jaws as the user rotates the key, thereby providing the user with increased leverage.

In general, however, most chucks that are commercially sold must be manually operated when tightening and loosening the jaws. This may make the use of a chuck time-consuming, since tightening and loosening often involves rotating the adjustment ring numerous times until the jaws are sufficiently tight against the work tool shaft or sufficiently loose to allow the work tool to be removed from the chuck. This may be a particular disadvantage in operations where a user is likely to use several different work tools during a job and may need to change work tools repeatedly. For example, this may be a problem in drilling and screwing jobs where a user needs to drill a number of pilot holes and then drive screws into the pilot holes. This may require numerous work tool changes between drill bits and driver bits during the course of the job. Because many conventional chucks must be manually operated, the time required to finish a job may be longer than desired and the user may tire before the job is done.

Another problem with manually operated chucks is that the user may sometimes fail to fully tighten the chuck. This may cause the jaws to lose their grip on the work tool when the power tool is operated. Usually, this results in the power tool and the chuck spinning around the shaft of the work tool without transferring rotational torque. This can be particularly annoying and inconvenient to a user, especially in the middle of a long job where the user has had to manually change a work tool numerous times. Sometimes a user may also have difficulty loosening a chuck to remove work tools. This may occur when the user overtightens the chuck or may occur due to unintentional tightening during use. This can also be frustrating and may increase the amount of time needed to finish a project.

BRIEF SUMMARY

Chuck embodiments are described that may be used to automatically tighten or loosen the jaws of a chuck in response to rotation of a power tool drive shaft. Preferably, the chucks have a body, a plurality of jaws and an adjustment ring. The adjustment ring may be threadably engaged with the jaws. When the adjustment ring is rotated in one direction, the jaws tighten by moving closer to each other. When the adjustment ring is rotated in the opposite direction, the jaws loosen by moving away from each other. An impact member is engaged with the adjustment ring. The impact member is rotatably limited and may be disengaged from the adjustment ring. When the drive shaft of the power tool is rotated, the adjustment ring impacts against the impact member. As a result, the adjustment ring and the body of the chuck rotate relative to each other causing the jaws of the chuck to loosen or tighten depending on the direction the drive shaft is rotating. Additional details and advantages are described below.

BRIEF DESCRIPTION OF SEVERAL VIEWS OF THE DRAWINGS

The invention may be more fully understood by reading the following description in conjunction with the drawings, in which:

FIG. 1 is a perspective view of one embodiment of a chuck;

FIG. 2 is an exploded, perspective view of the chuck;

FIG. 3 is a cross-sectional view of the chuck;

FIG. 4 is a perspective view of the body of the chuck connected to the drive shaft of a power tool;

FIG. 5 is a perspective view of the locking sleeve, impact member and joint member of the chuck;

FIG. 6 is a side elevational view of the outer sleeve of the chuck;

FIG. 7 is a perspective view of the washer, spring, impact member and joint member of the chuck connected to the frame of the power tool;

FIG. 8 is a forward perspective view of the impact member, joint member and washer connected to the frame of the power tool;

FIG. 9 is a rearward perspective view of the impact member, joint member and washer connected to the frame of the power tool;

FIG. 18 is an exploded, perspective view of the chuck;

FIG. 19 is a cross-sectional view of the chuck;

FIG. 20 is a perspective view of the chuck, showing the outer sleeve or housing removed;

FIG. 21 is a perspective view of the impact member of the chuck;

FIG. 22 is a perspective view of the joint member of the chuck;

FIG. 23 is a forward perspective view of the impact member, joint member and balls of the chuck in an assembly;

FIG. 24 is an exploded perspective view of the impact member, joint member, locking sleeve and washer of the chuck;

FIG. 30 is an enlarged elevational view of the forward end of the drill, showing the auto-lock chuck with an impact member positioned forward;

FIG. 31 is an enlarged elevational view of the forward end of the drill, showing the auto-lock chuck with the impact member positioned rearward;

FIG. 32 is an exploded perspective view of another drill, showing a tool housing and an auto-lock chuck;

FIG. 45 is a side, perspective view of a portion of the chuck, showing the joint member and impact member assembled;

FIG. 46 is a front, perspective view of a locking sleeve of the chuck;

FIG. 47 is a front, perspective view of a portion of the chuck, showing the joint member, impact member and locking sleeve assembled;

DETAILED DESCRIPTION

Figure 10:
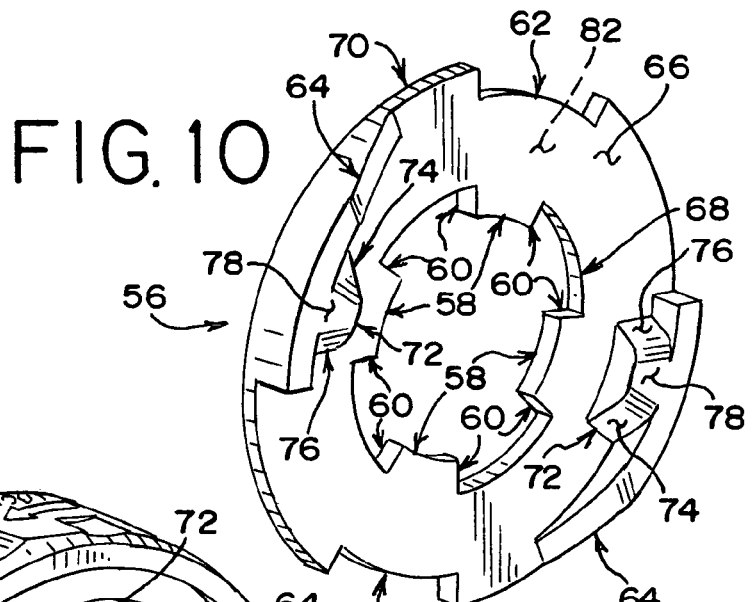
FIG. 10 is a perspective view of the impact member of the chuck.

Referring now to the drawings, and particularly to FIGS. 1 through 12, one embodiment of an auto-lock chuck 10 is shown. As shown in FIG. 4, the auto-lock chuck 10 includes a body 12 that may be threadably attached at the rear end 14 thereof to the drive shaft 16 of a power tool. Thus, the body 12 is rotatable in response to rotation of the drive shaft 16. The auto-lock chuck 10 also includes a series of three jaws 18 at the forward end 20 thereof that are capable of gripping the shaft of a work tool. As shown in FIG. 2, each of the jaws 18 have threads 22 on the outside surfaces at the rear ends thereof and include jaw faces 24 on the inside surfaces at the front ends thereof. The jaws 18 are mounted within bores 26 angularly positioned through the body 12 and spaced equally thereabout. An adjustment ring 28 is mounted within a groove 30 in the body 12 and is longitudinally restrained by the groove 30. The adjustment ring 28 includes threads 32 on the inner diameter which are engaged with the threads 22 of the jaws 18. Accordingly, rotation of the adjustment ring 28 relative to the body 12 adjusts the jaws 18 by moving the jaws 18 between a small diametrical relationship and a large diametrical relationship. Thus, when the adjustment ring 28 and the body 12 are rotated relative to each other in one direction, the jaws 18 move towards each other in a tightening direction. Similarly, when the adjustment ring 28 and the body 12 are rotated relative to each other in the opposite direction, the jaws 18 move away from each other in a loosening direction. An outer sleeve 34 is pressed onto or otherwise fixed to the adjustment ring 28 so that the adjustment ring 28 may be manually manipulated when the body 12 is stationary by rotating the outer sleeve 34 in either the tightening or loosening direction to move the jaws 18 closer or farther apart.

As shown in FIGS. 2, 5, 8, 9 and 10, the auto-lock chuck 10 also includes a joint member 36, or guide member, positioned rearwardly of the body 12. The joint member 36 has holes 38 extending longitudinally therethrough so that the joint member 36 may be rigidly attached with screws to the frame 40 of the power tool. The joint member 36 also includes a central bore 42 extending therethrough for installing the drive shaft 16 of the power tool through. The joint member 36 also has longitudinal slots 44 equally spaced thereabout. The sides 46 of the slots 44 serve as guide surfaces which extend generally straight along the longitudinal axis of the chuck 10. The slots 44 also include rearwardly facing surfaces 48, or backstops, that serve as a forward stop for the impact member 56 described below.

As shown in FIGS. 2 and 7-9, a washer 50 may be installed behind the joint member 36. The washer 50 includes holes 52 extending therethrough which match the holes 38 in the joint member 36 so that the washer 50 is also rigidly attached to the frame 40 of the power tool when mounting screws are used to install the auto-lock chuck 10 on the power tool. As described below, the washer 50 serves as a backstop for the spring 80. Additionally, as further described below, the washer 50 is provided with a tab 54 that serves as a stop for the rotation of the locking sleeve 84.

As shown in FIGS. 2, 5 and 8-12, an impact member 56 is mounted about the joint member 36. The impact member 56 has four tabs 58 equally spaced about the inner diameter 68 that are sized to fit within the slots 44 of the joint member 36. The side surfaces 60 of the tabs 58 are designed to engage with the guide surfaces 46 of the joint member slots 44 in order to allow the impact member 56 to move rearward while preventing the impact member 56 from rotating. The rearwardly facing surfaces 48 of the joint member 36 also prevent the tabs 58 of the impact member 56 from moving forward past the front end of the joint member 36. Slots 62 are provided along the outer diameter 70 of the impact member 56 to allow the blocks 88 of the locking sleeve 84 to be assembled therethrough. The impact member 56 also includes circumferential surfaces 64, or ramps, extending from the front face 66 of the impact member 56 and longitudinally inclined therefrom. Preferably, the circumferential surfaces 64 are adjacent the outer diameter 70 of the impact member 56. Protrusions 72 that extend from the front face 66 of the impact member 56 are also provided. As shown in FIG. 10, each of the protrusions 72 have two opposing impact surfaces 74, 76 and a bypass surface 78 defined by the top of each protrusion 72. Preferably, the angled slope of each opposing impact surface 74, 76 is different from the other. For example, the first impact surface 74 used for tightening the jaws 18 as described below may have a slope that is less steep than the second impact surface 76 used for loosening the jaws 18.

As shown in FIGS. 2 and 7, a spring 80 is positioned between the washer 50 and the rear surface 82 of the impact member 56. Thus, the spring 80 biases the impact member 56 forward against the blocks 88 of the locking sleeve 84 as described below.

Figure 11:
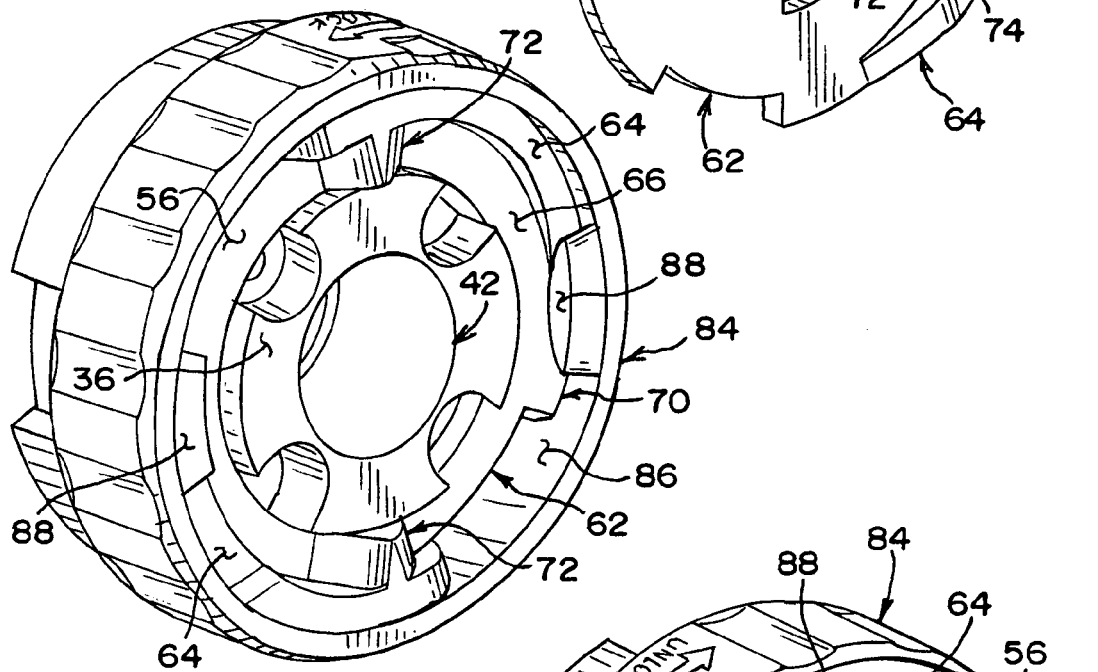
FIG. 11 is a forward perspective view of the locking sleeve, impact member and joint member of the chuck, showing the locking sleeve unlocked.
Figure 12:
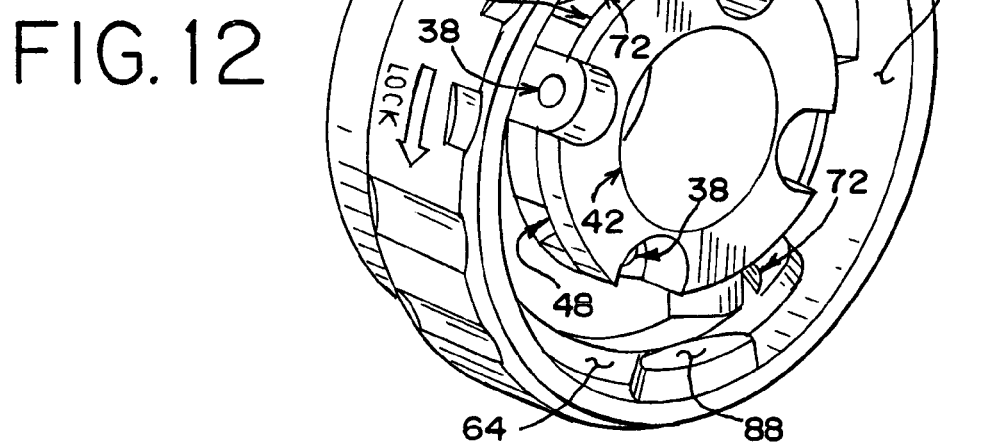
FIG. 12 is a forward perspective view of the locking sleeve, impact member and joint member of the chuck, showing the locking sleeve locked.

As shown in FIGS. 2, 5, 11 and 12, the locking sleeve 84, or locking member, may be used to control the position of the impact member 56. The outer diameter 70 of the impact member 56 is sized so that the inner diameter 86 of the locking sleeve 84 may freely rotate thereabout. The locking sleeve 84 also includes two blocks 88 that extend inward from the inner diameter 86 of the locking sleeve 84. The locking sleeve 84 is mounted on the auto-lock chuck 10 to allow the locking sleeve 84 to rotate relative to the impact member 56 and the joint member 36. As shown in FIG. 2, the locking sleeve 84 includes an internal oversized slot 90. When the auto-lock chuck 10 is assembled, the tab 54 of the washer 50 fits within the oversized slot 90. As a result, the washer tab 54 allows the locking sleeve 84 to rotate within a limited range of rotation since the washer tab 54 stops against the side surfaces 92 of the oversized slot 90. In addition, the locking sleeve 84 is provided with a forward facing surface 94 that engages the rear surface of the washer 50. This prevents the locking sleeve 84 from moving longitudinally forward. Accordingly, as shown in FIGS. 11 and 12, the impact member 56 may be forced rearward against the spring 80 by rotating the locking sleeve 84. As shown in FIG. 11, the locking sleeve 84 is rotated so that the blocks 88 of the locking sleeve 84 are adjacent the front face 66 of the impact member 56. In this configuration, the spring 80 biases the impact member 56 forward to its forwardmost position. As shown in FIG. 12, the locking sleeve 84 is rotated so that the locking sleeve blocks 88 follow the inclined circumferential ramp surfaces 64. Because the locking sleeve 84 is prevented from moving forward during rotation, the locking sleeve blocks 88 force the impact member 56 rearward against the bias of the spring 80.

As shown in FIGS. 2 and 6, the outer sleeve 34 is provided with protrusions 96 that extend rearwardly from the rear surface 98 of the outer sleeve 34. Preferably, the number of protrusions 96 matches the number of protrusions 72 on the impact member 56, which in this case is two. Each of the protrusions 96 has two opposing impact surfaces 100, 102 corresponding to the impact surfaces 74, 76 of the impact member protrusions 72. Like the impact member protrusions 72, each of the opposing impact surfaces 100, 102 may have angular slopes that are different from each other. For example, the first impact surface 100 of the outer sleeve 34 (corresponding to the first impact surface 74 of the impact member 56) may have a slope that is less steep than the second impact surface 102 (corresponding to the second impact surface 76 of the impact member 56). As described below, this provides for a greater impact when loosening the jaws 18 of the auto-lock chuck 10 (i.e., the second impact surfaces 76, 102 with steeper slopes) and less impact when tightening the jaws 18 of the auto-lock chuck 10 (i.e., the first impact surfaces 74, 100).

The operation of the auto-lock chuck 10 is now apparent. One advantage of the auto-lock chuck 10 is that the jaws 18 of the auto-lock chuck 10 can be tightened and/or loosened automatically using the rotation of the power tool drive shaft 16. Thus, in the embodiment described above, when the locking sleeve 84 is rotated to the unlocked position, where the locking sleeve blocks 88 are adjacent the front face 66 of the impact member 56, the spring 80 biases the impact member 56 forward. Then, when the drive shaft 16 of the power tool is rotated, the body 12 of the chuck 10, the adjustment ring 28 and the outer sleeve 34 rotate together with the drive shaft 16. However, as the outer sleeve 34 rotates, the outer sleeve protrusions 96 and the impact member protrusions 72 interfere with each other and impact against the corresponding impact surfaces 74, 76, 100, 102. For example, when the drive shaft 16 is rotated in one direction, the first impact surfaces 74, 100 will impact against each other (i.e., tightening). When the drive shaft 16 is rotated in the opposite direction, the second impact surfaces 76, 102 will impact against each other (i.e., loosening). Because of the impacts between the outer sleeve protrusions 96 and the impact member protrusions 72, the rotational movement of the outer sleeve 34 is restricted relative to the body 12 of the auto-lock chuck 10. This causes the adjustment sleeve 28 to slow rotation, thereby producing relative rotation between the body 12 and the adjustment ring 28. As a result, the threaded engagement 22, 32 between the adjustment ring 28 and the jaws 18 causes the jaws 18 to tighten or loosen depending on the rotation of the drive shaft 16. Because the angled slope of the first impact surfaces 74, 100 are less steep than the second impact surfaces 76, 102, the tightening torque of each impact in the tightening direction is less than the loosening torque of each impact in the loosening direction. Once the impact force between the outer sleeve protrusions 96 and the impact member protrusions 72 is sufficient to overcome the bias of the spring 80, the impact member 56 moves rearward against the spring 80, and the outer sleeve protrusions 96 and impact member protrusions 72 separate. The outer sleeve 34 then begins to rotate with the body 12 again. Thus, the outer sleeve protrusions 96 rotate by the bypass surfaces 78 of the impact member protrusions 72. Once the outer sleeve protrusions 96 have rotated past the bypass surfaces 78 of the impact member protrusions 72, the spring 80 biases the impact member 56 forward again. As a result, the protrusions 96, 72 of the outer sleeve 34 and impact member 56 repeatedly impact as the drive shaft 16 rotates so that the jaws 18 continue to loosen or tighten.

Another advantage of the auto-lock chuck 10 is that the locking sleeve 84 may be used to disengage the outer sleeve protrusions 96 and the impact member protrusions 72. As described above, when the locking sleeve 84 is rotated to the locked position, where the locking sleeve blocks 88 are adjacent the inclined circumferential surfaces 64, the impact member 56 is forced rearward against the spring 80. As a result, the impact member protrusions 72 are forced rearward. Therefore, when the outer sleeve 34 rotates with the drive shaft 16, the impact member protrusions 72 and outer sleeve protrusions 96 do not impact. Thus, in this configuration, the outer sleeve 34 rotates smoothly without experiencing any impacts from the protrusions 72, 96. Because of this, no loosening or tightening torque is applied to the adjustment ring 28 when the impact member 56 is locked rearward. A further advantage is that the outer sleeve 34 may be manually operated like a conventional forward sleeve of a chuck to hand tighten or loosen the jaws 18 if desired.

Figure 13:
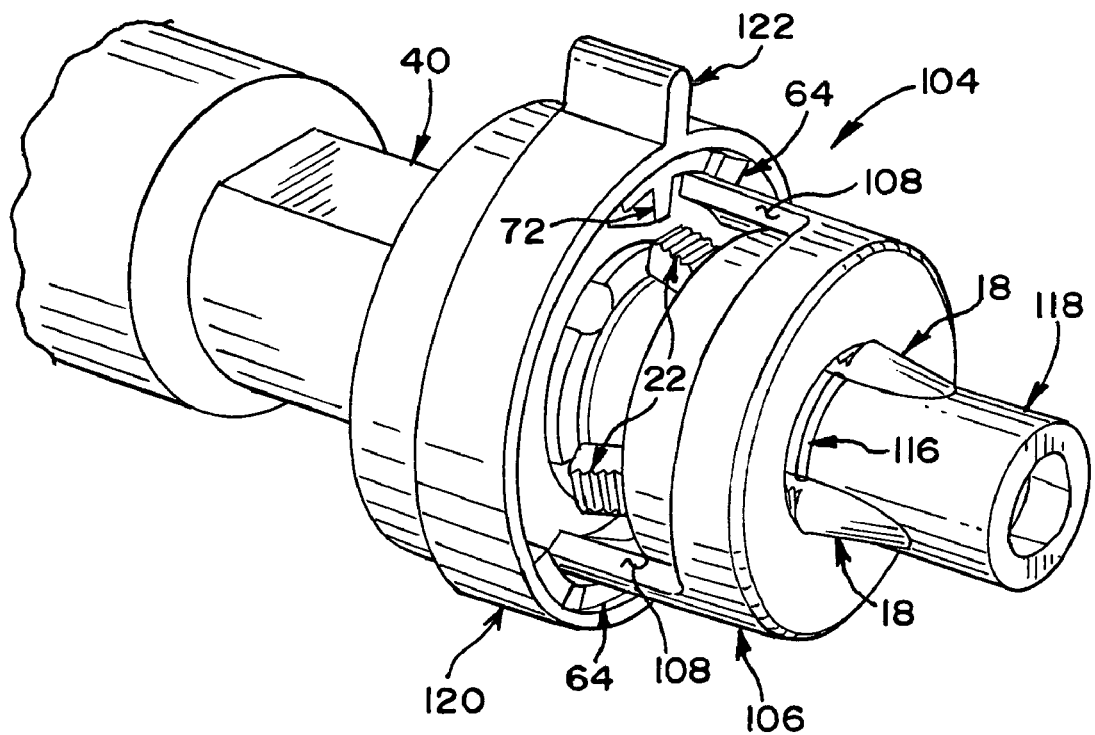
FIG. 13 is a perspective view of another embodiment of a chuck, showing the housing removed.
Figure 14:
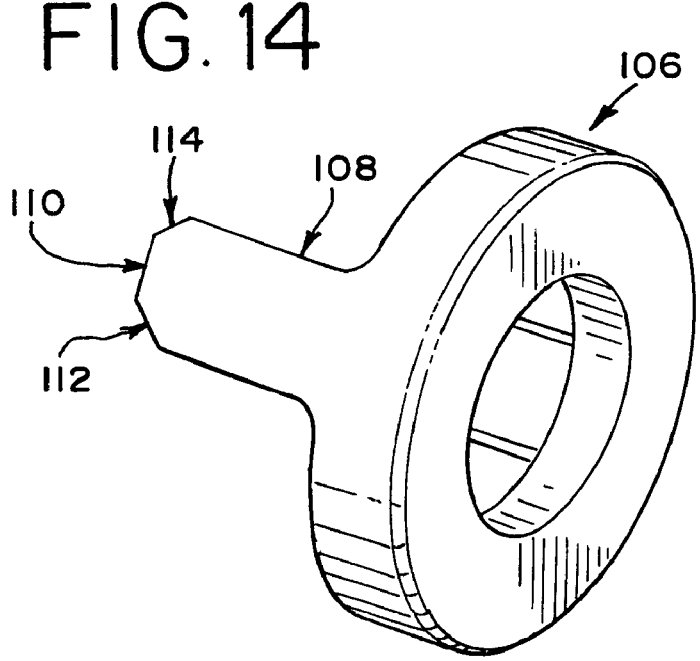
FIG. 14 is a perspective view of the inner sleeve of the chuck.
Figure 15:
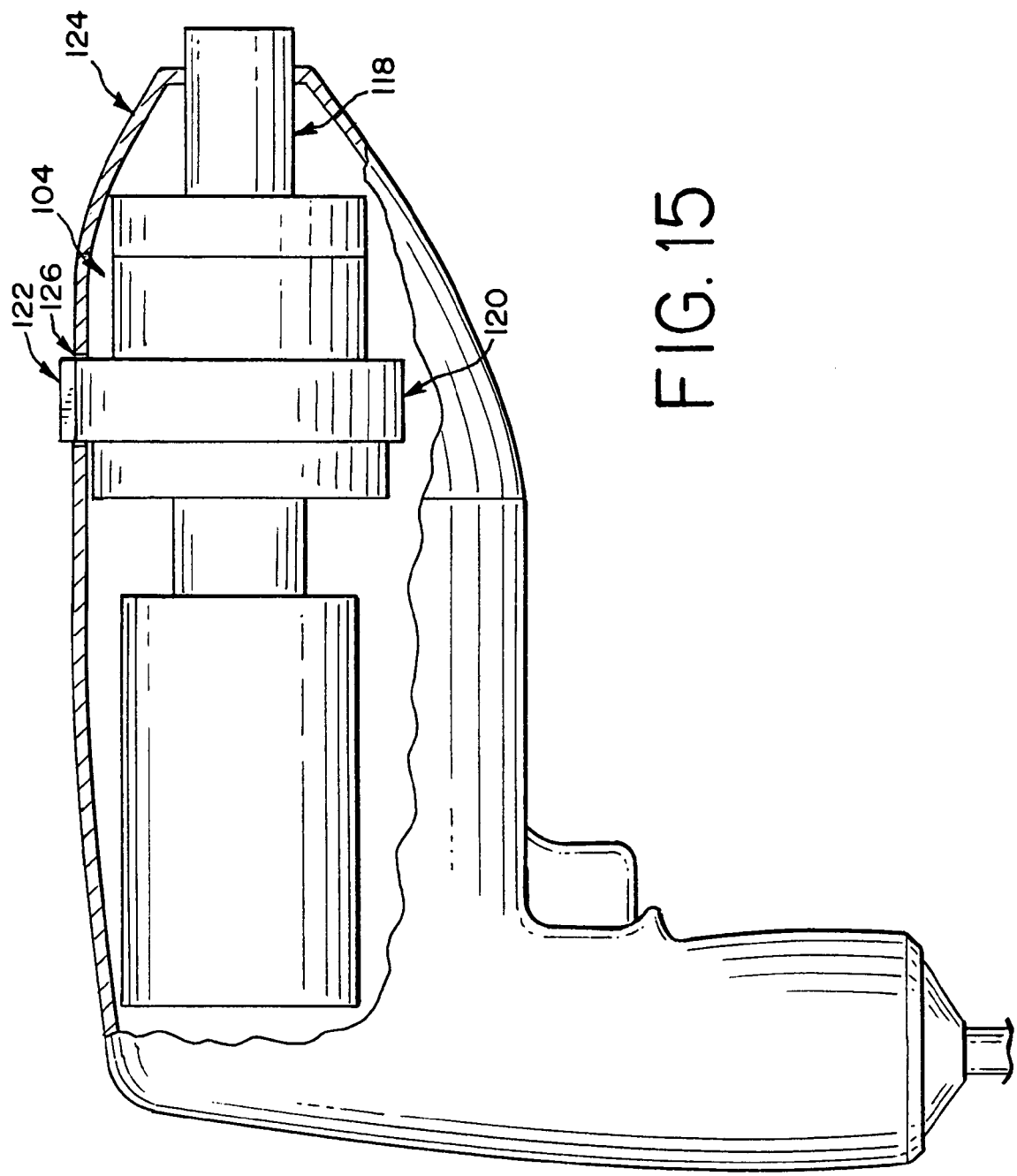
FIG. 15 is a side view of the chuck mounted within the housing of a power tool.

Referring now to FIGS. 13 through 15, another embodiment of an auto-lock chuck 104 is shown. The manner of operation and some of the features of the auto-lock chuck 104 shown in FIGS. 13-15 are similar to the embodiment described above. Therefore, it is unnecessary to repeat every similarity between the embodiments for a complete understanding.

As shown in FIGS. 13 and 14, an inner sleeve 106 is provided with two arms 108 that extend rearwardly therefrom to the impact member 56. The inner sleeve 106 may be made integral with the adjustment ring with threads formed on the inner diameter thereof, or the inner sleeve 106 may be pressed onto or otherwise fixed to a separate adjustment ring. The rearward ends of the arms 108 form protrusions 110 that are similar in function to the outer sleeve protrusions 96 described above. As described above, the protrusions 110 may have opposing impact surfaces 112, 114, with the first impact surfaces 112 having angular slopes that are less steep than the second impact surfaces 114. A retaining ring 116 may be used to longitudinally restrain the inner sleeve 106 and adjustment ring onto the body 118. The locking sleeve 120 is also similar to the locking sleeve 84 described above, but a lever 122 is provided which extends radially outward from the outer diameter of the locking sleeve 120.

The manner of operation of the auto-lock chuck 104 shown in FIGS. 13-15 is similar to the auto-lock chuck 10 described above. However, one advantage of this embodiment is that the chuck 104 may be positioned within a housing 124 that is fixedly connected to the frame of the power tool. The housing 124 may be fixedly connected to the frame of a power tool by screws or other fastening techniques or may be fixedly connected by being integrally formed with the power tool frame. Thus, the housing 124 may encompass the body 118 of the auto-lock chuck 104 and the other components thereof. In this embodiment, the housing 124 is not operably connected to the inner sleeve 106 and adjustment ring. As a result, a conventional forward sleeve is not needed for the auto-lock chuck 104. This may lower the cost of the auto-lock chuck 104 and provide for a cleaner appearance of the power tool. In addition, an opening 126 may be provided through the housing 124 for the lever 122 of the locking sleeve 120 to extend therethrough. Thus, the locking sleeve 120 may be operated by moving the lever 122 back-and-forth through the opening 126. Another advantage of using a housing fixedly connected to the frame is that a separate joint member may not be needed since the impact member may be guided rearward by features integrated into the frame of the power tool.

Figure 16:
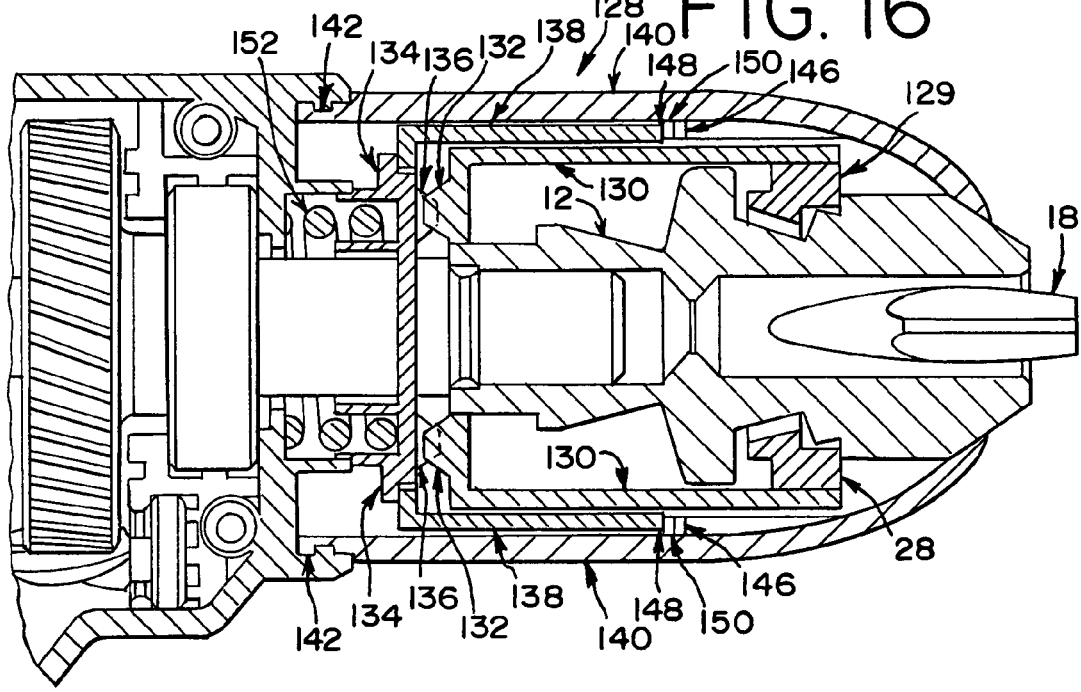
FIG. 16 is a cross-sectional view of another embodiment of a chuck.

Referring now to FIG. 16, another embodiment of an auto-lock chuck 128 is shown. The manner of operation and some of the features of the auto-lock chuck 128 shown in FIG. 16 are similar to the embodiments described above. Therefore, it is unnecessary to repeat every similarity for a complete understanding.

As shown in FIG. 16, an inner sleeve 130 is provided which extends rearwardly and includes protrusions 132 at the rear end thereof. The inner sleeve 130 may be pressed onto or otherwise fixed to the adjustment ring 129. The protrusions 132 are similar to the protrusions 96, 110 described above. Similarly, the impact member 134 includes forward-facing protrusions 136 similar to the impact member protrusions 72 described above. The impact member 134 also includes an interlinking sleeve 138, or flange, that extends radially outward toward the inner diameter of the outer sleeve 140. The interlinking sleeve 138 may also extend forward between the inner sleeve 132 and the outer sleeve 140 as shown. The outer sleeve 140 is longitudinally restrained relative to the body 12 with interlocked grooves 142 or by other means. The outer sleeve 140 also includes inner blocks 146 that engage the forward end 148 of the interlinking sleeve 138. A ramp 150 is formed between each of the inner blocks 146 and the interlinking sleeve 138 by either providing longitudinally inclined surfaces on the inner blocks 146 or the interlinking sleeve 138 or both.

The manner of operation of the auto-lock chuck 128 shown in FIG. 16 is similar to the auto-lock chucks 10, 104 described above. However, one advantage of this embodiment is that the outer sleeve 140 functions as a locking member. Thus, when the outer sleeve 140 is rotated in one direction, the inner blocks 146 force the interlinking sleeve 138 and the impact member 134 rearward against the spring 152 to disengage the impact member protrusions 136 and the inner sleeve protrusions 132. Thus, when the impact member 134 is forced rearward, impacts between the protrusions 132, 136 are prevented in order to provide smooth rotation of the inner sleeve 130 and the adjustment ring 129. When the outer sleeve 140 is rotated in the opposite direction, the inner blocks 146 allow the interlinking sleeve 138 and the impact member 134 to move forward so that the protrusions 132, 136 engage and impact against each other. Thus, the jaws 18 of the auto-lock chuck 128 may be automatically tightened and loosened by rotating the drive shaft 16 of the power tool as described above.

Referring now to FIGS. 17 through 27, another embodiment of an auto-lock chuck 156 is shown. The manner of operation and some of the features of the auto-lock chuck 156 shown in FIGS. 17-27 are similar to the embodiments described above. Therefore, it is unnecessary to repeat every similarity for a complete understanding.

As shown in FIGS. 18 and 22-23, the joint member 158 is provided with two V-shaped circumferential grooves 160. Each V-shaped circumferential groove 160 is formed by a first and second circumferential groove 162, 164, with the first circumferential groove 162 corresponding to the tightening direction and the second circumferential groove 164 corresponding to the loosening direction. The tightening and loosening directions are described herein for reference and may be reversed if desired. Preferably, the circumferential grooves 160 have a spherical shape to accept a ball 166. In addition, the apex 168 of each V-shaped circumferential groove 160 may be near the forward end of the joint member 158 with the legs extending longitudinally rearward. Thus, the first and second circumferential grooves 162, 164 act like inclined ramps. Like the joint member 36 described above, the rotational movement of the joint member 158 is limited by attaching the joint member 158 to the frame 40 of the power tool with screws that extend through holes 170 in the joint member 158.

As shown in FIGS. 18 and 21-23, the impact member 172 is mounted about the joint member 158. The impact member 172 has two V-shaped circumferential grooves 174 that correspond to the V-shaped circumferential grooves 160 of the joint member 158. Each V-shaped circumferential groove 174 is formed by a first and second circumferential groove 176, 178, with the first circumferential groove 176 corresponding to the tightening direction and the second circumferential groove 178 corresponding to the loosening direction. Like the joint member circumferential grooves 160, the impact member circumferential grooves 174 have a spherical shape to accept a ball 166 engaged with the joint member circumferential grooves 160. Preferably, the apex 180 of each V-shaped circumferential groove 174 may be near the rear end of the impact member 172 with the legs extending longitudinally forward. Thus, the first and second circumferential grooves 176, 178 act like inclined ramps. As shown in FIG. 23, the impact member 172 is mounted on the joint member 158 with balls 166 engaged in each of the V-shaped circumferential grooves 160, 174. To help with assembly, an inlet groove 182 for each ball 166 may be provided at the end of the circumferential grooves 174. The impact member 172 also includes two protrusions 184 that extend forward from the front face 186 of the impact member 172. As shown in FIG. 21, each of the protrusions 184 have two opposing impact surfaces 188, 190 and a bypass surface 192 defined by the top of each protrusion. As shown, the impact surfaces 188, 190 may be straight along the longitudinal axis of the auto-lock chuck 156. As further described below, the first impact surface 188 is used for tightening the jaws 18 and the second impact surface 190 is used for loosening the jaws 18. As shown in FIGS. 21 and 24, the impact member 172 may also include lock arms 194 that extend rearward from the rear surface 196 of the impact member 172. As described below, the lock arms 194 may be engaged with the locking sleeve 198 to disengage the protrusions 184 of the impact member 172 and the protrusions 222 of the inner sleeve 218.

As shown in FIGS. 18 and 24, the locking sleeve 198 is provided with inner blocks 200 extending inward from the inner diameter of the locking sleeve 198. The locking sleeve 198 is mounted on the auto-lock chuck 156 to allow the locking sleeve 198 to rotate. Thus, by rotating the locking sleeve 198, the inner blocks 200 may engage the lock arms 194 to rotate the impact member 172. As described below, this allows the locking sleeve 198 to disengage the impact member 172 from the inner sleeve 218.

As shown in FIGS. 18 and 24, a washer 202 may be mounted behind the joint member 158. The washer 202 includes holes 204 extending therethrough which match the holes 170 extending through the joint member 158 so that the washer 202 is rigidly attached to the frame 40 of the power tool when mounting screws are used to install the auto-lock chuck 156. The washer 202 is also provided with detent holes 206 for positioning the locking sleeve 198. Accordingly, balls 208 may be positioned between the rear face of the washer 202 and the front face of the locking sleeve 198. The balls 208 are received by the detent holes 206 in the washer 202 and recesses 210 in the front face of the locking sleeve 198. As a result, the locking sleeve 198 may be provided with detent positions to positively retain the locking sleeve 198 in a desired position.

As shown in FIG. 18, a spring 212 is positioned between the washer 202 and the impact member 172. Thus, the spring 212 biases the impact member 172 forward to engage the impact member protrusions 184 with the inner sleeve protrusions 222 as described below. In order to allow free rotation between the spring 212 and the impact member 172, a bearing 214 made of balls and a washer 216 are provided between the spring 212 and the rear surface 196 of the impact member 172.

Figure 25:
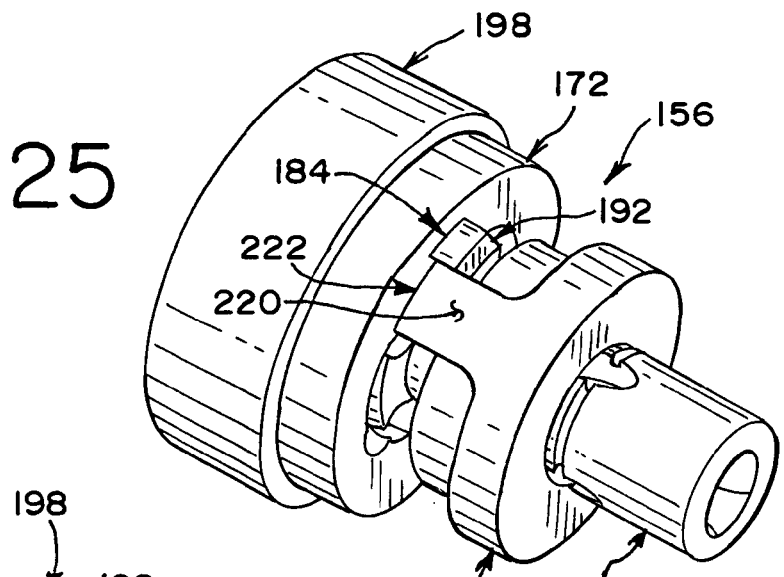
FIG. 25 is a perspective view of the chuck, showing the inner sleeve and the impact member engaged.
Figure 26:
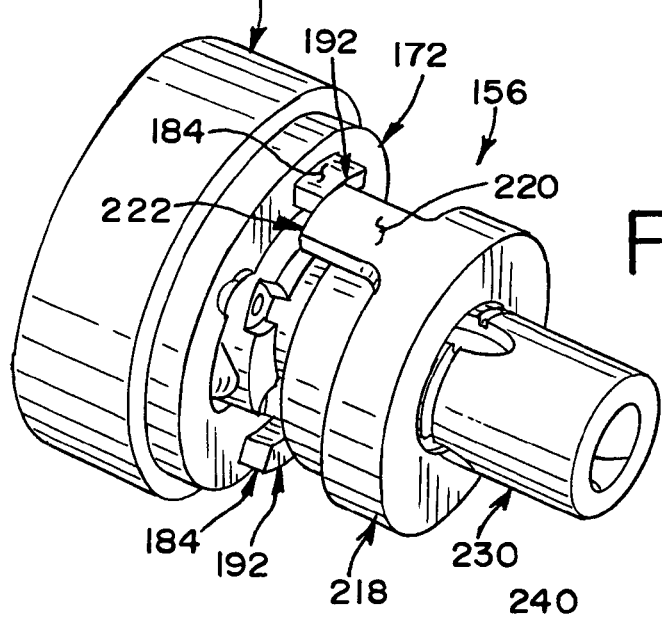
FIG. 26 is a perspective view of the chuck, showing the inner sleeve and the impact member disengaged.

As shown in FIGS. 18 and 25-26, an inner sleeve 218 is provided with two arms 220 that extend rearwardly to the impact member 172. The inner sleeve 218 may be made integral with the adjustment ring with threads formed on the inner diameter thereof, or the inner sleeve 218 may be pressed onto or otherwise fixed to a separate adjustment ring. The rearward ends of the arms 220 form protrusions 222. The protrusions 222 have opposing first and second impact surfaces 224, 226, which may be longitudinally straight along the longitudinal axis of the auto-lock chuck 156. A retaining ring 228 may be used to longitudinally restrain the adjustment ring 28 and the inner sleeve 218 onto the body 230.

Figure 17:
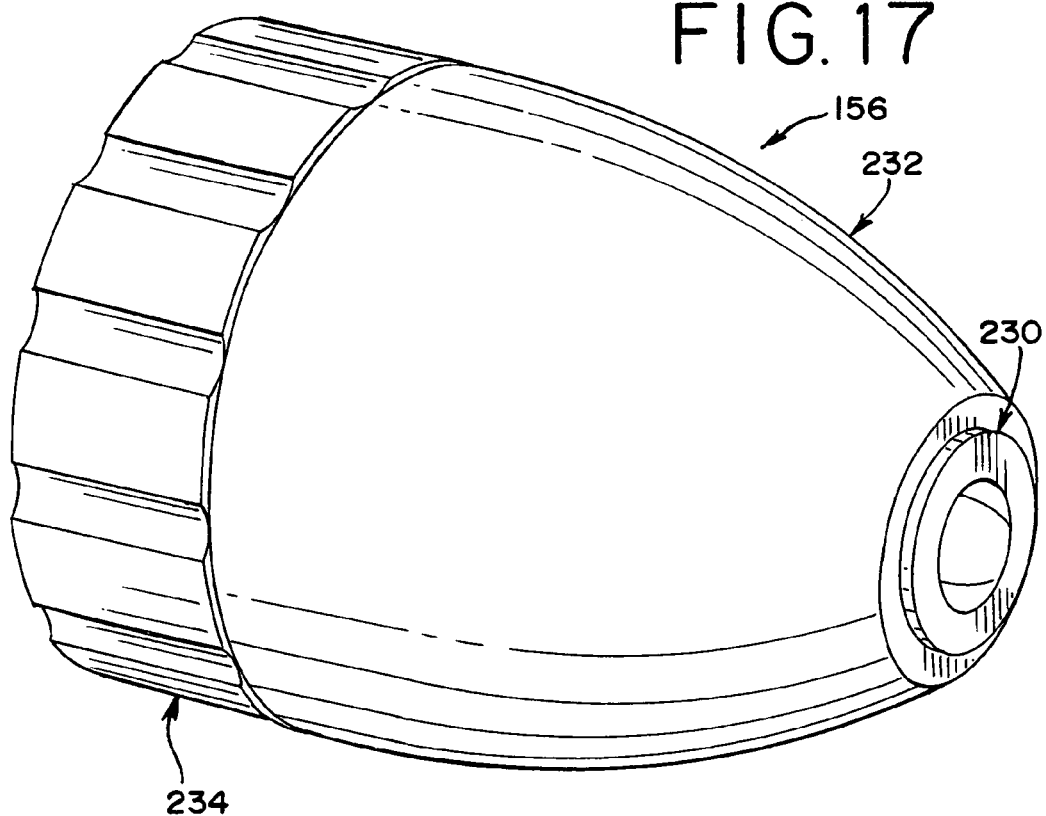
FIG. 17 is a perspective view of another embodiment of a chuck.
Figure 27:
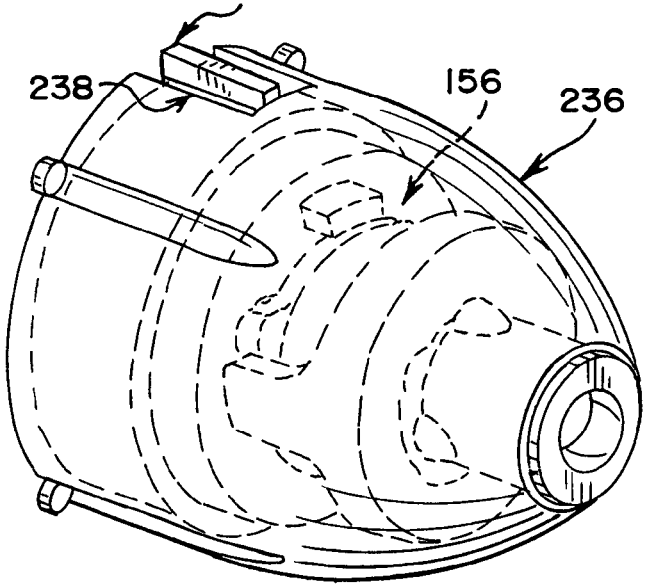
FIG. 27 is a perspective view of the chuck, showing a housing adapted to be attached to the frame of a power tool encompassing the chuck.

As shown in FIGS. 17 and 27, two different types of outer sleeves may be used. In FIG. 17, an outer sleeve 232 is shown that is pressed onto or otherwise fixed to the inner sleeve 218 and/or adjustment ring. In this embodiment, the adjustment ring may be manually manipulated by rotating the outer sleeve 232 in either the tightening or loosening direction to move the jaws 18 closer or farther apart. As shown, it may be preferably to provide the locking sleeve 198 with a grip 234 to allow the locking sleeve 198 to be easily grasped and rotated. In FIG. 27, a housing 236 is shown that may be fixedly attached to the frame 40 of the power tool. Thus, the housing 236 may encompass the body 230 of the auto-lock chuck 156 and the other components thereof. In this embodiment, the housing 236 is not operably connected to the inner sleeve 218 and adjustment ring so that the inner sleeve 218 and adjustment ring rotate freely inside the housing 236. An opening 238 through the housing 236 may also be provided so that the locking sleeve 198 may be provided with a lever 240 that extends through the opening 238. Thus, the locking sleeve 198 may be operated by moving the lever 240 through the opening 238.

The manner of operation of the auto-lock chuck 156 shown in FIGS. 17-27 is now apparent. The auto-lock chuck 156 functions similarly to the embodiments described above, and thus, not every similarity need be repeated. One advantage of the embodiment shown in FIGS. 17-27 is that the impacts to the inner sleeve 218 and adjustment ring may be smoother. This may minimize the chances that the auto-lock chuck 156 may jam and may also reduce damage to the motor and gear train by reducing the peak torques caused by impacts between the inner sleeve 218 and the impact member 172. As a result, the auto-lock chuck 156 may be more useful for low torque operations.

As described above, the inner sleeve 218 and adjustment ring tend to rotate with the body 230 of the auto-lock chuck 156 when the drive shaft 16 of the power tool is rotated. However, when the impact surfaces 224, 226 of the inner sleeve protrusions 222 impact against the impact surfaces 188, 190 of the impact member protrusions 184, the rotational speed of the adjustment ring is slowed relative to the body 230. This causes the threaded engagement between the adjustment ring and the jaws 18 to either tighten or loosen the jaws 18 depending on the direction the drive shaft 16 is rotating. This may be seen in FIG. 25. Continued rotation of the body 230 then causes the impact member 172 to rotate with the inner sleeve 218 and the adjustment ring. As the impact member 172 rotates, the circumferential grooves 162, 164, 176, 178 guide the impact member 172 rearward. The rearward movement of the impact member 172 also biases the spring 212. This creates a resistance torque that limits the rotation of the impact member 172, thereby inducing a tightening or loosening torque in the threaded engagement between the adjustment ring and the jaws 18. As shown in FIG. 26, once a sufficient amount of torque is applied to the impact member 172 to force the impact member 172 fully rearward, the protrusions 184, 222 of the impact member 172 and the inner sleeve 218 disengage. The inner sleeve protrusions 222 then rotate past the bypass surfaces 192 of the impact member protrusions 184. Once the inner sleeve protrusions 222 rotate fully past the impact member protrusions 184, the spring 212 biases the impact member 172 forward again. As the drive shaft 16 continues to rotate, the protrusions 184, 222 repeatedly impact against each other to further tighten or loosen the jaws 18 depending on the direction of rotation of the drive shaft 16.

The locking sleeve 198 may be used to disengage the inner sleeve protrusions 222 and impact member protrusions 184 once the jaws 18 are fully tightened or loosened. This is accomplished by rotating the locking sleeve 198 to engage the inner blocks 200 of the locking sleeve 198 with the lock arms 194 of the impact member 172. The rotation of the locking sleeve 198 then causes the impact member 172 to rotate. As a result, the impact member 172 is guided rearward by the circumferential grooves 162, 164, 176, 178. By maintaining the locking sleeve 198 in this position, the impact member 172 remains in a rearward position. Therefore, when the inner sleeve 218 rotates, the protrusions 222 of the inner sleeve 218 rotate past the bypass surfaces 192 of the impact member protrusions 184 without impacting together. When the operator wishes to use the auto-locking/unlocking function again, the operator may rotate the locking sleeve 198 back, which releases the impact member 172 to move forward and engage the inner sleeve 218.

Referring now to FIGS. 28 through 31, an auto-lock chuck 242 is shown installed onto an electrically powered drill 244. Although the drill 244 shown in FIGS. 28-31 is an AC powered drill 244, other power tools may also be used. The manner of operation and some of the features of the auto-lock chuck 242 are similar to the embodiments described above. Therefore, it is unnecessary to repeat every similarity for a complete understanding.

Figure 28:
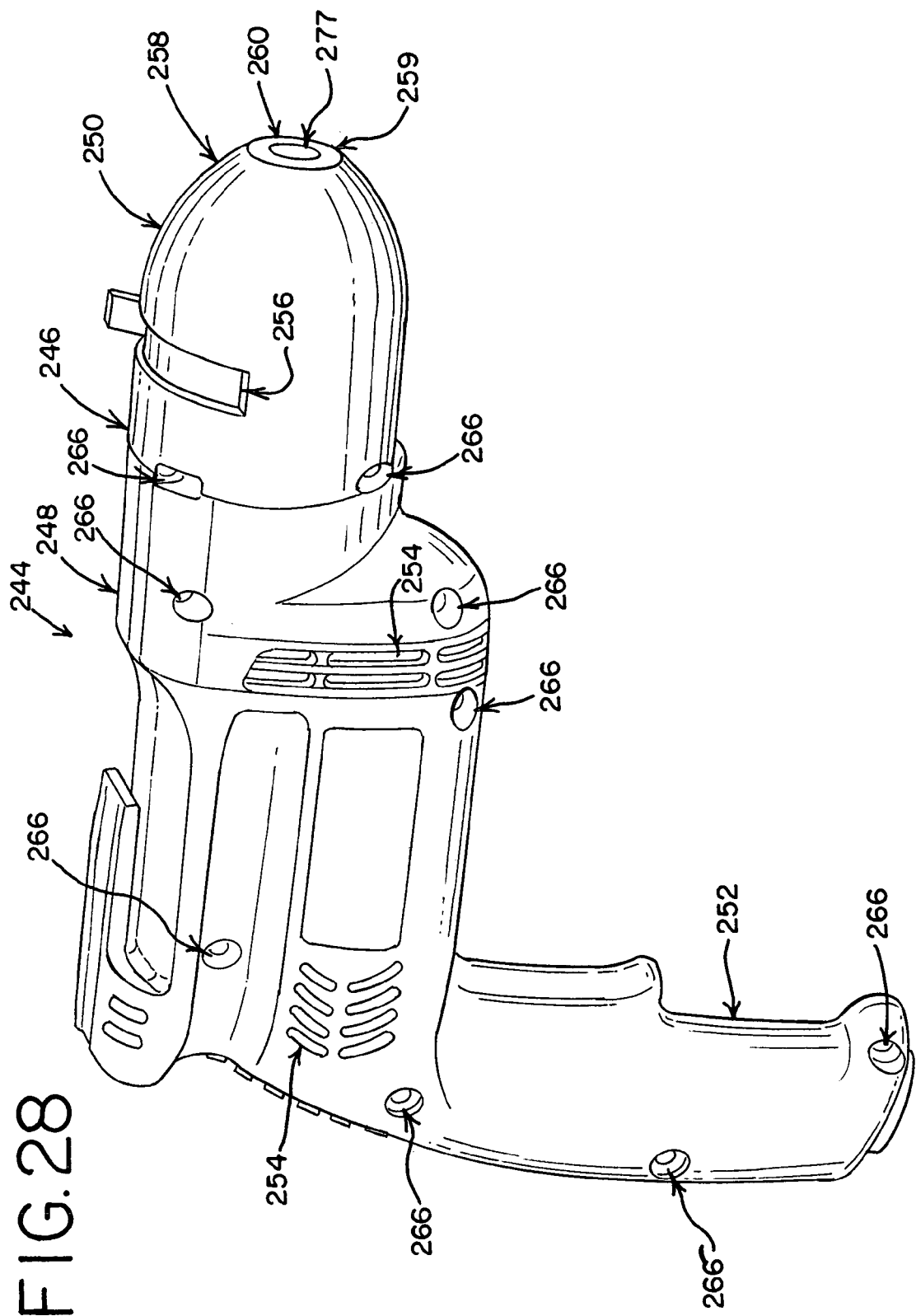
FIG. 28 is a perspective view of a drill, showing an integral tool housing enclosing the motor and an auto-lock chuck.

As shown in FIG. 28, an integral tool housing 246 may be used to encompass the motor and the chuck 242. The tool housing 246 is made up of a first housing portion 248 that encompasses the motor and other internal components and a second housing portion 250 that encompasses the chuck 242. The first housing portion 248 may also have a handle 252 for holding and controlling the drill 244 and vents 254 for cooling the motor. The second housing portion 250 may have a radial opening 256 extending therethrough to allow actuation of the locking member 272. The second housing portion 250 also includes an opening 259 that extends through the forward end 258 to allow work tools to be received through the opening 259 and into the axial bore 277 of the chuck 242. Thus, the forward end 258 of the second housing portion 250 may be positioned in proximity to the forward end 260 of the chuck body 276. One advantage of this configuration is that no adjustment sleeve is positioned between the forward end 258 of the second housing portion 250 and the forward end 260 of the chuck body 276. As a result, the drill 244 presents a clean forward end with an integrated auto-lock chuck 242 assembly. Thus, a separate chuck assembly attached to the forward end of the drill is not needed. Moreover, only a small portion of the rotatable chuck 242 is accessible to the user, thereby minimizing contact with the internal moving components of the chuck 242. Also, because there is no type of adjustment sleeve at the forward end, the user may be less concerned with inadvertently rotating an adjustment sleeve.

Figure 29:
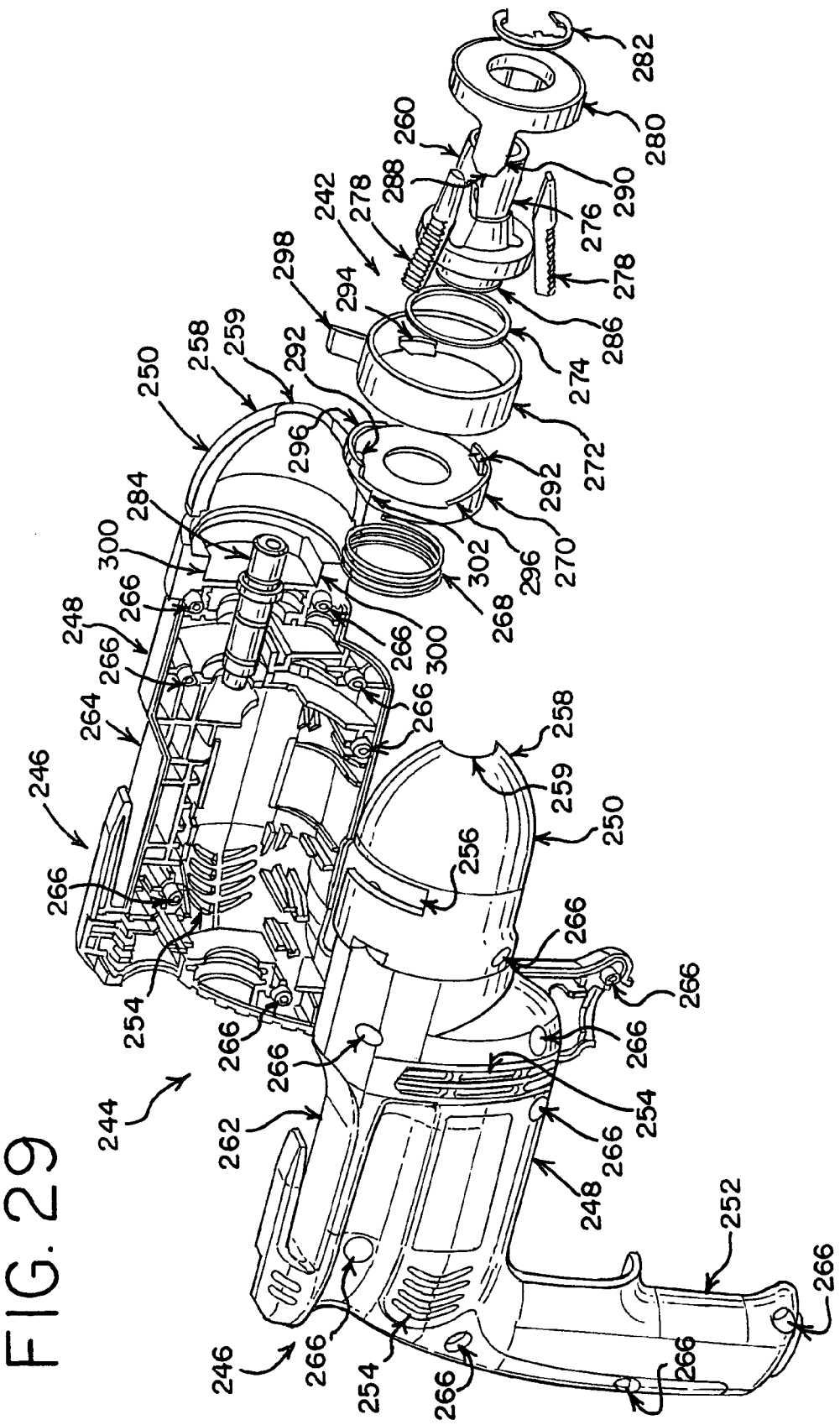
FIG. 29 is an exploded perspective view of the drill, showing the tool housing and the auto-lock chuck.

As shown in FIG. 29, the tool housing 246 may be made up of a first tool housing 262 and a second tool housing 264 that are separated along the longitudinal axis to form two sides of the tool housing 246. The first and second tool housings 262, 264 may be attached to each other by screws or other fasteners that pass through attachment holes 266 in the first and second tool housings 262, 264. The auto-lock chuck 242 may include a spring 268, an impact member 270, a locking member 272, a washer 274, a body 276, jaws 278, an inner sleeve 280 and a retaining ring 282. The features and manner of operation of the auto-lock chuck 242 are readily apparent from the detailed description above and need not be repeated here.

As described above, the drive shaft 284 of the drill 244 is connected to the rear end 286 of the chuck body 276. In general, the auto-lock chuck 242 operates by operably engaging a surface of the adjustment ring with the first housing portion 248. This causes the adjustment ring and the body 276 to rotate relative to each other to adjust the jaws 278 in response to the drive shaft 284. The adjustment ring may be engaged either directly or indirectly with the first tool housing 262 depending on the particular configuration of the auto-lock chuck 242 and the tool housing 246. For example, in the auto-lock chuck 242 shown in FIG. 29, the adjustment ring is integral with the inner sleeve 280. Protrusions 288 on the end of the inner sleeve arms 290 engage protrusions 292 on the impact member 270. Since the impact member 270 is engaged with the first housing portion 248, this causes the adjustment ring to rotate relative to the chuck body 276 to adjust the jaws 278 of the chuck 242. However, other arrangements are also possible. The locking member 272 may also be provided with blocks 294 that engage circumferential surfaces 296 on the impact member 270 to disengage the impact member 270 from the inner sleeve 280. The locking member 272 may have a lever 298 that extends through the radial opening 256 in the tool housing 246 to allow the locking member 272 to be manually actuated.

As shown in FIGS. 30-31, the first housing portion 248 may have guide surfaces 300 formed therein. The impact member 270 may have corresponding side surfaces 302 engaged with the guide surfaces 300 of the first housing portion 248. Thus, the side surfaces 302 of the impact member 270 are restrained from rotating relative to the first housing portion 248 by the guide surfaces 300. However, the side surfaces 302 of the impact member 270 are axially moveable relative to the first housing portion guide surfaces 300. Accordingly, as shown in FIG. 30, the spring 268 biases the impact member 270 forward to engage the inner sleeve 280 with the impact member 270. As shown in FIG. 31, the impact member 270 may be forced rearwardly to compress the spring 268 by either actuating the locking member 272 (not shown in FIGS. 30-31) or by impacts between the protrusions 288 of the inner sleeve 280 and the protrusions 292 of the impact member 270.

One advantage of the embodiment shown in FIGS. 28-31 is that a separate joint member may be eliminated by providing guide surfaces 300 within the first housing portion 248 to guide the impact member 270. This may reduce the cost of the auto-lock chuck 242 and may provide a more compact assembly. Another advantage is that the second housing portion 250 may be integrated with the first housing portion 248. This may simplify manufacturing of the drill 244 and reduce costs. In addition, because the second housing portion 250 is fixed in place and cannot move rotationally or axially, the user may be able to better handle and control the drill 244 since a user may grasp the second housing portion 250 when the chuck 242 is rotating.

Figure 33:
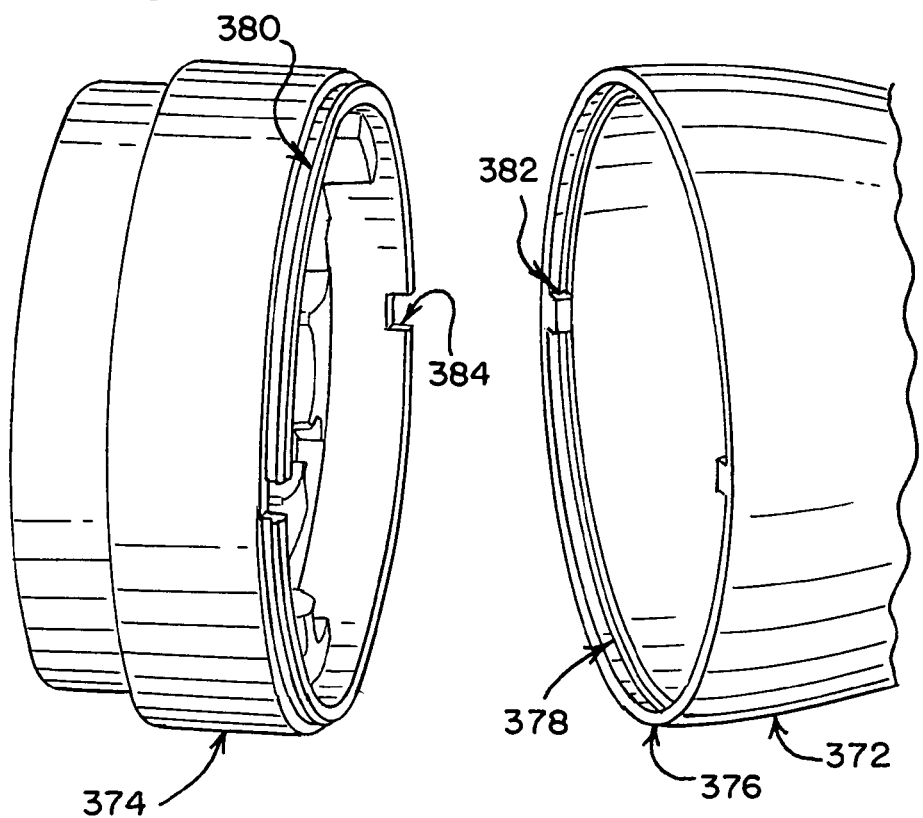
FIG. 33 is an enlarged perspective view of a front housing portion and a locking member, showing a way to rigidly attach the front housing portion to the locking member.
Figure 34:
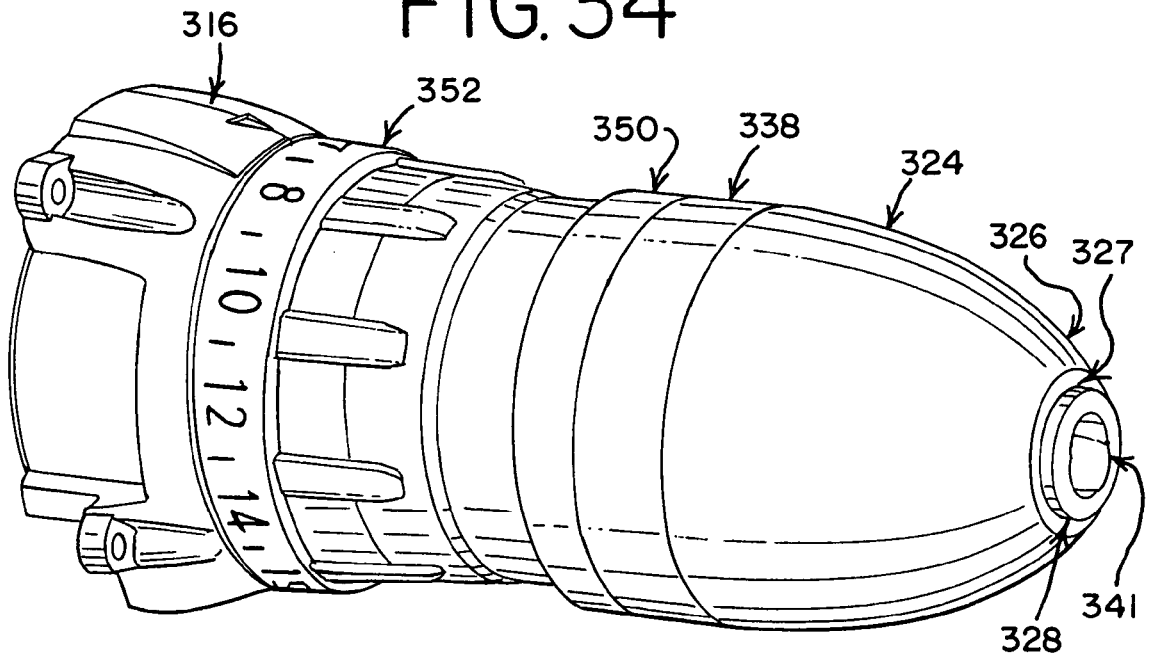
FIG. 34 is a perspective view of the front end of the drill, showing the front end of the chuck body, the front housing cover, the locking member, a spacer, a torque adjustment sleeve and a front housing.

Referring now to FIGS. 32 through 34, another auto-lock chuck 304 is shown installed onto an electrically powered drill 306. Although the drill 306 shown in FIGS. 32-34 is a DC powered drill 306, other power tools may also be used. The manner of operation and some of the features of the auto-lock chuck 304 are similar to the embodiments described above. Therefore, it is unnecessary to repeat every similarity for a complete understanding.

In this embodiment, the first housing portion 308 may be made up of right and left side housings 310, 312, a rear housing 314 and a front housing 316. The right and left side housings 310, 312 may include a handle 318 and vents 320 for the motor. A battery pack 322 may be attached to the bottom of the handle 318. The second housing portion 324, which encloses the chuck 304, may be fixedly connected indirectly to the first housing portion 308 or may be fixedly attached to the inner sleeve 346 and adjustment ring as described further below.

As shown in FIGS. 32 and 34, the second housing portion 324 includes an opening 327 that extends through the forward end 326 to allow work tools to be received through the opening 327 and into the axial bore 341 of the chuck 304. Thus, the forward end 326 of the second housing portion 324 may be positioned in proximity to the forward end 328 of the chuck body 340. Thus, a separate adjustment sleeve is not positioned between the forward end 326 of the second housing portion 324 and the forward end 328 of the chuck body 340.

The auto-lock chuck 304 may include a washer 330, joint member 332, spring 334, impact member 336, locking member 338, body 340, jaws 342, washer 344, inner sleeve 346 and retaining ring 348. A spacer 350 may also be provided to fixedly connect the auto-lock chuck 304 to the front housing 316. However, if desired, the spacer 350 may be eliminated and the chuck 304 may be directly connected to front housing 316. A torque adjustment sleeve 352 may also be provided rearward of the locking member 338. The details of the auto-lock chuck 304 are readily apparent from the descriptions above and need not be repeated here. As described above, the drive shaft 354 of the drill 306 is connected to the rear end 356 of the chuck body 340. In general, the auto-lock chuck 304 operates by operably engaging a surface of the adjustment ring with the first housing portion 308. This causes the adjustment ring and the body 340 to rotate relative to each other to adjust the jaws 342 in response to the drive shaft 354. In FIG. 32, the adjustment ring is integral with the inner sleeve 346. Protrusions 358 on the end of the inner sleeve arms 360 engage protrusions 362 on the impact member 336. The tabs 364 of the impact member 336 are engaged with the guide surfaces 366 of the joint member 332. Since the joint member 332 is engaged with the first housing portion 308 through the spacer 350 and the front housing 316, the adjustment ring is caused to rotate relative to the chuck body 340 to adjust the jaws 342 of the chuck 304. The locking member 338 may also be provided with blocks 368 that engage circumferential surfaces 370 on the impact member 336 to disengage the impact member 336 from the inner sleeve 346.

As shown in FIG. 33, in one configuration, the second housing portion 324, 372 may be fixedly connected to the first housing portion 308 through the locking member 338, 374. Accordingly, the rear end 376 of the second housing portion 372 may be rigidly attached to the locking member 374. This may be achieved in several ways. For example, as shown in FIG. 33, the rear end 376 of the second housing portion 372 may have an internal circular groove 378. The locking member 374 may also have a corresponding external circular rib 380 that receives the circular groove 378 of the second housing portion 372. Longitudinal tabs 382 on the second housing portion 372 are also received by longitudinal slots 384 in the locking member 374. Thus, the second housing portion 372 is rotatable with the locking member 374. Therefore, the second housing portion 372 is fixedly connected to the first housing portion 308 since the locking member 374 is fixedly connected to the first housing portion 308 through the impact member 336, joint member 332, washer 330, spacer 350 and front housing 316. Accordingly, in this configuration, the second housing portion 372 is not operably engaged with the adjustment ring. As a result, this configuration may provide improved handling and control characteristics because the second housing portion 372 does not rotate with the body 340 of the chuck 304. Thus, a user may grasp the second housing portion 372 while the drill 306 is being operated.

In another configuration, the second housing portion 324 may be fixedly attached to the inner sleeve 346 and adjustment ring. Thus, in this configuration, the second housing portion 324 functions like an outer sleeve 324 to allow the adjustment ring to be manually manipulated to adjust the jaws 342. This may be accomplished by pressing the outer sleeve 324 onto the inner sleeve 346 or otherwise fixing the outer sleeve 324 and the inner sleeve 346 together. Therefore, in this configuration, the outer sleeve 324 is not rigidly attached to the locking member 338 as described above. Accordingly, the outer sleeve 324 is not fixedly connected to the first housing portion 308. An advantage of this configuration is that the adjustment ring may be manually manipulated by turning the outer sleeve 329 to tighten and loosen the jaws 342. The locking member 338 may also be accessed as a full ring positioned rearward of the outer sleeve 324. A selector sleeve, such as the torque adjustment sleeve 352, may also be provided rearward of the locking member 338.

Referring now to FIGS. 35 through 40, another embodiment of a chuck is shown. The manner of operation and some of the features of the chuck shown in FIGS. 35-40 are similar to the embodiments described above. Therefore, it is unnecessary to repeat every similarity for a complete understanding.

The chuck shown in FIGS. 35-40 includes an outer sleeve 386, an outer sleeve retention recess (not shown), an adjustment ring 388, a bearing 390, an inner sleeve 392, inner sleeve tabs 394, a body 396, jaws 398, an impact plate 400, impact plate protrusions 402, impact plate slots 404, a retention rib 406, a locking sleeve 408, a locking sleeve indicator 410, detent recesses 412, locking sleeve blocks 414, an impact member 416, impact member protrusions 418, circumferential surfaces 420, impact member tabs 422, a joint member 424, joint member slots 426, a spring 427, a spring retainer 430, anchor slots 432, locking sleeve springs 434, detents 436, anchors 438, a spacer 440, an indicator 442, clutch sleeve springs 444, and a clutch sleeve 446.

As described above, one advantage of the chuck is that it may be used as an auto-lock and/or auto-unlock chuck. Accordingly, when the locking sleeve 408 is rotated to the auto-lock/unlock position, the locking sleeve blocks 414 rotate along the downward slope of the circumferential surfaces 420 of the impact member 416. As the locking sleeve 408 is rotated, the spring 427 biases the impact member 416 forward toward the locking sleeve blocks 414 to allow the protrusions 402, 418 of the impact plate 400 and the impact member 416 to engage. Preferably, in the auto-lock/unlock position, the locking sleeve blocks 414 are positioned away from the circumferential surfaces 420 of the impact member 416. Further forward movement of the impact member 416 may be restrained by stop surfaces at the end of the joint members slots 426.

In the auto-lock/unlock mode of operation, the body 396 of the chuck is rotated in the forward or reverse direction by the drive shaft of the power tool. As the body 396 rotates, the adjustment ring 388 rotates with the body 396. Since the inner sleeve 392 is fixed to the adjustment ring 388, either through a press fit or other means, the inner sleeve 392 and the impact plate 400 rotate with the adjustment ring 388. However, when the protrusions 402 of the impact plate 400 impact against the protrusions 418 of the impact member 416, a reaction force results in a tightening or loosening between the adjustment ring 388 and the jaws 398. Tapered surfaces on the impact plate protrusions 402 and the impact member protrusions 418 cause the impact plate 400 to push the impact member 416 rearward against the spring 427 as the impact plate 400 continues to rotate. The joint member slots 426 provide longitudinal guide surfaces along the sides that allow the impact member tabs 422 to move longitudinally but prevent the impact member tabs 422 from rotating. As the impact member 416 moves rearward, the protrusions 402, 418 of the impact plate 400 and the impact member 416 clear each other. The spring 427 then pushes the impact member 416 forward again. The impacts and the resulting tightening/loosening reaction continues repeatedly as the body 396 rotates.

To stop the auto-lock/unlock function, the locking sleeve 408 is rotated away from the auto-lock/unlock position. This causes the locking sleeve blocks 414 to rotate along the upward slope of the circumferential surfaces 420 of the impact member 416, thus forcing the impact member 416 rearward against the spring 427. As a result, the protrusions 402, 418 of the impact plate 400 and the impact member 416 disengage from each other. In this mode of operation, the protrusions 402, 418 of the impact plate 400 and the impact member 416 do not contact each other as the body 396 rotates. Thus, no impacts occur and the chuck rotates smoothly.

Figure 36:
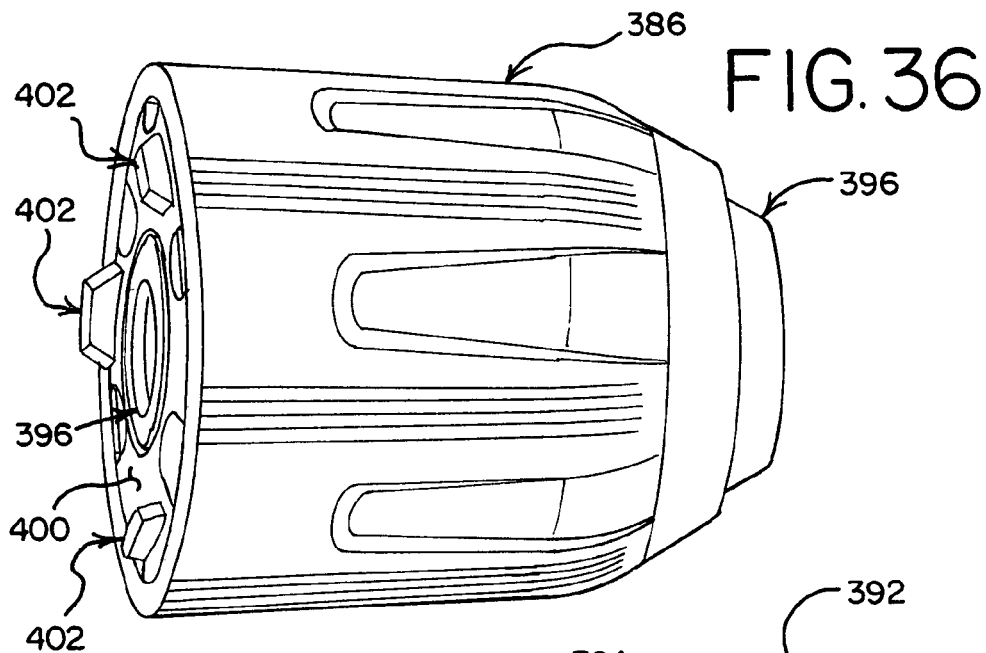
FIG. 36 is a side, perspective view of a portion of the chuck, showing an outer sleeve and impact plate protrusions.
Figure 37:
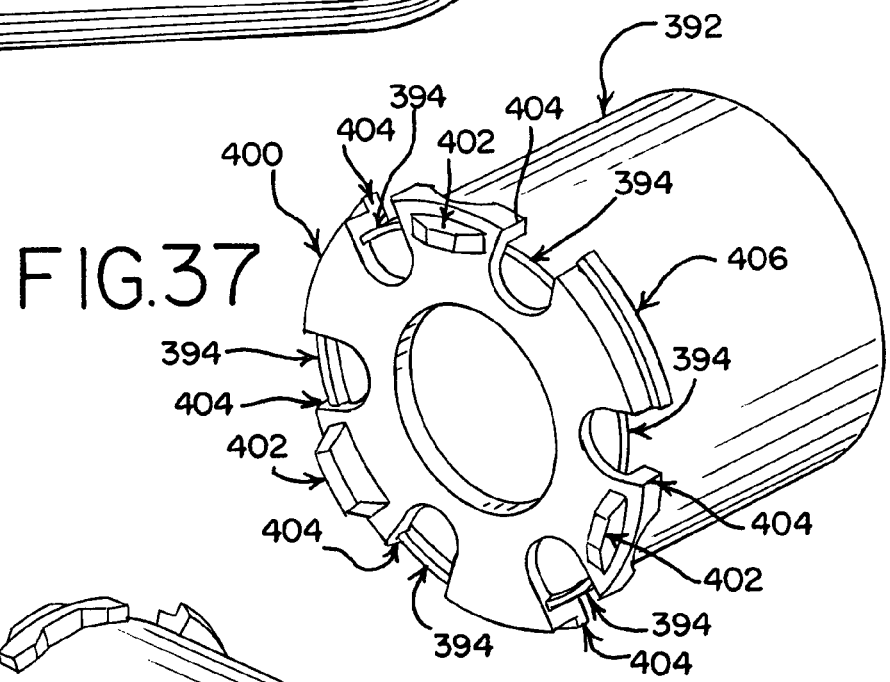
FIG. 37 is a rear, perspective view of a portion of the chuck, showing an impact plate connected to an inner sleeve.
Figure 38:
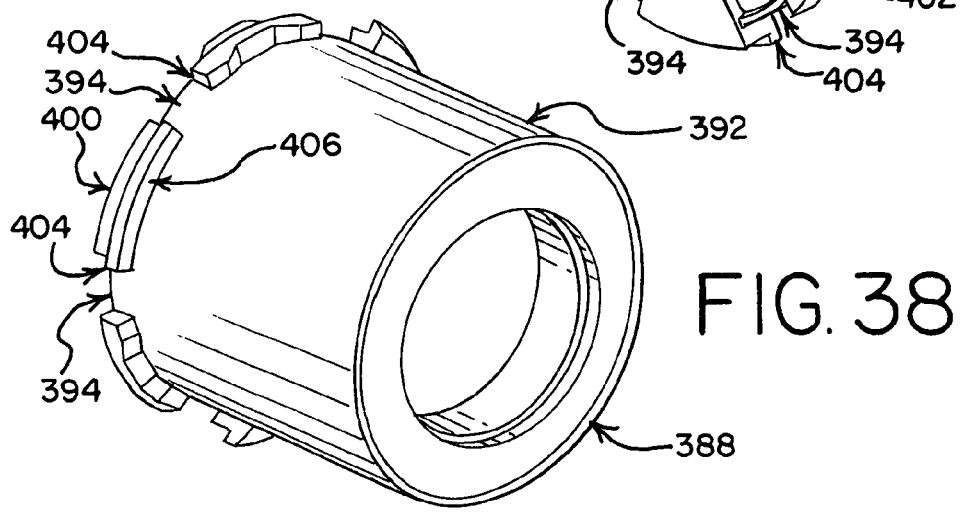
FIG. 38 is a front, perspective view of a portion of the chuck, showing the impact plate, the inner sleeve and an adjustment ring.

As shown in FIGS. 36-38, the inner sleeve 392 may be connected to the impact plate 400 with tabs 394 on the rearward end of the inner sleeve 392 which engage slots 404 in the impact plate 400. As a result, the inner sleeve 392 may be fixedly attached to the impact plate 400. As shown, the inner sleeve 392 may be cylindrical in shape and extends rearwardly from the adjustment ring 388. The protrusions 402 extend rearwardly from the impact plate 400 and may be formed integrally with the impact plate 400. The impact plate 400 may also be provided with a retention rib 406 that may extend around the circumference of the impact plate 400. The retention rib 406 may engage a retention recess (not shown) in the outer sleeve 386 to axially retain the outer sleeve 386 onto the chuck. The outer sleeve 386 may be rotationally fixed to the adjustment ring 388 in various ways, such as press-fitting the outer sleeve 386 onto the inner sleeve 392, providing ribs in the outer sleeve 386 that engage recesses in the adjustment ring 388, or providing one or more rotational stops in the retention recess of the outer sleeve that engage the slots 404 in the impact plate 400. As shown in FIG. 38, the inner sleeve 392 may be fixedly attached to the adjustment ring 388 by press-fitting the adjustment ring 388 into the inner sleeve 392. If desired, the adjustment ring 388 may be made of a two-piece ring that is held together by the inner sleeve 392.

Figure 39:
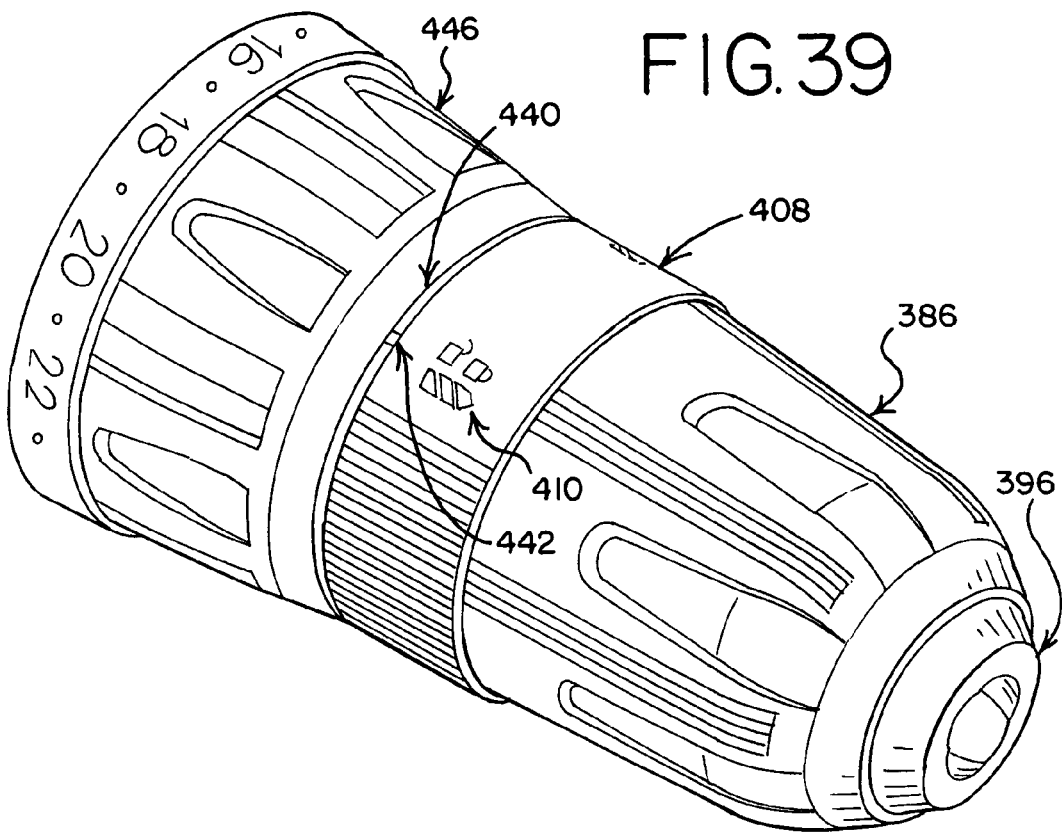
FIG. 39 is a front, perspective view of the chuck.
Figure 40:
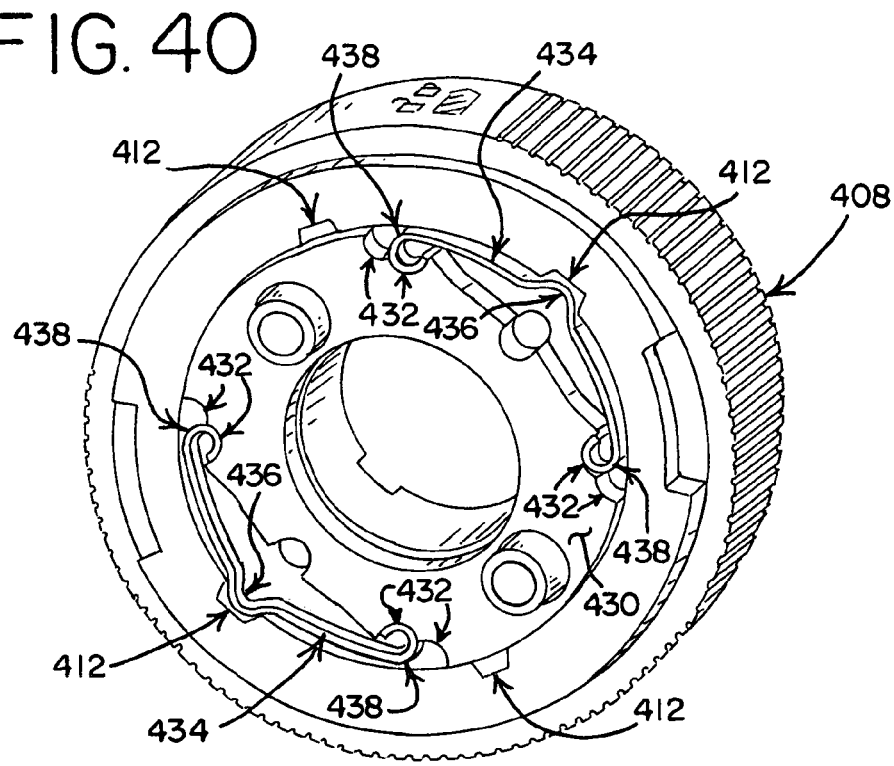
FIG. 40 is a rear, perspective view of a portion of the chuck, showing a locking sleeve.

As shown in FIGS. 39-40, the spacer 440 may be provided with an indicator 442, such as an identifiable groove or a color marking. As recognized by those of skill, the spacer 440 that is shown is fixed to the frame of the power tool and does not rotate. Thus, the indicator 442 provides the user with an easy to see mark that may be used in visually positioning the locking sleeve 408. As shown, the locking sleeve 408 may also be provided with indicators 410 that may be lined up with the indicator 442 on the spacer 440 to position the locking sleeve 408 in the engaged and disengaged positions for the auto-lock/unlock function.

As shown in FIG. 40, detent positions may also be provided so that the user feels an identifiable sensory click when the locking sleeve 408 is rotated. The detent positions may be provided with locking sleeve springs 434 that engage the spring retainer 430 and the locking sleeve 408. The locking sleeve springs 434 have anchors 438 at each side that engage anchor slots 432 in the spring retainer 430. The middle portion of the locking sleeve springs 434 form detents 436 that engage detent recesses 412 in the locking sleeve 408. Thus, when the locking sleeve 408 is rotated from one position to another, the detents 436 of the locking sleeve springs 434 pop out of the recesses 412 in the locking sleeve 408 and the spring anchors 438 pop into the adjacent anchor slots 432. When the locking sleeve 408 reaches the next position, the detents 436 of the springs 434 pop into the next detent recesses 412 and the spring anchors 438 pop back into the first anchor slots 432.

Referring now to FIGS. 41 through 47, another embodiment of a chuck is shown. The manner of operation and some of the features of the chuck shown in FIGS. 41-47 are similar to the embodiments described above. Therefore, it is unnecessary to repeat every similarity for a complete understanding.

The chuck shown in FIGS. 41-47 includes an outer sleeve 448, an outer sleeve retention recess (not shown), an adjustment ring 450, a bearing 452, an inner sleeve 454, inner sleeve tabs 456, a body 458, jaws 460, an impact plate 462, impact plate protrusions 464, impact plate slots 466, a retention rib 468, a locking sleeve 470, a locking sleeve indicator 472, detent recesses 474, locking sleeve blocks 476, an impact member 478, impact member protrusions 480, circumferential surfaces 482, V-shaped circumferential grooves 484, a joint member 486, V-shaped circumferential grooves 488, balls 490, a bearing 492, a washer 494, a spring 496, a spring retainer 498, anchor slots (not shown), locking sleeve springs 502, detents 504, anchors 506, a spacer 508, an indicator 510, clutch sleeve springs 512, and a clutch sleeve 514.

Figure 35:
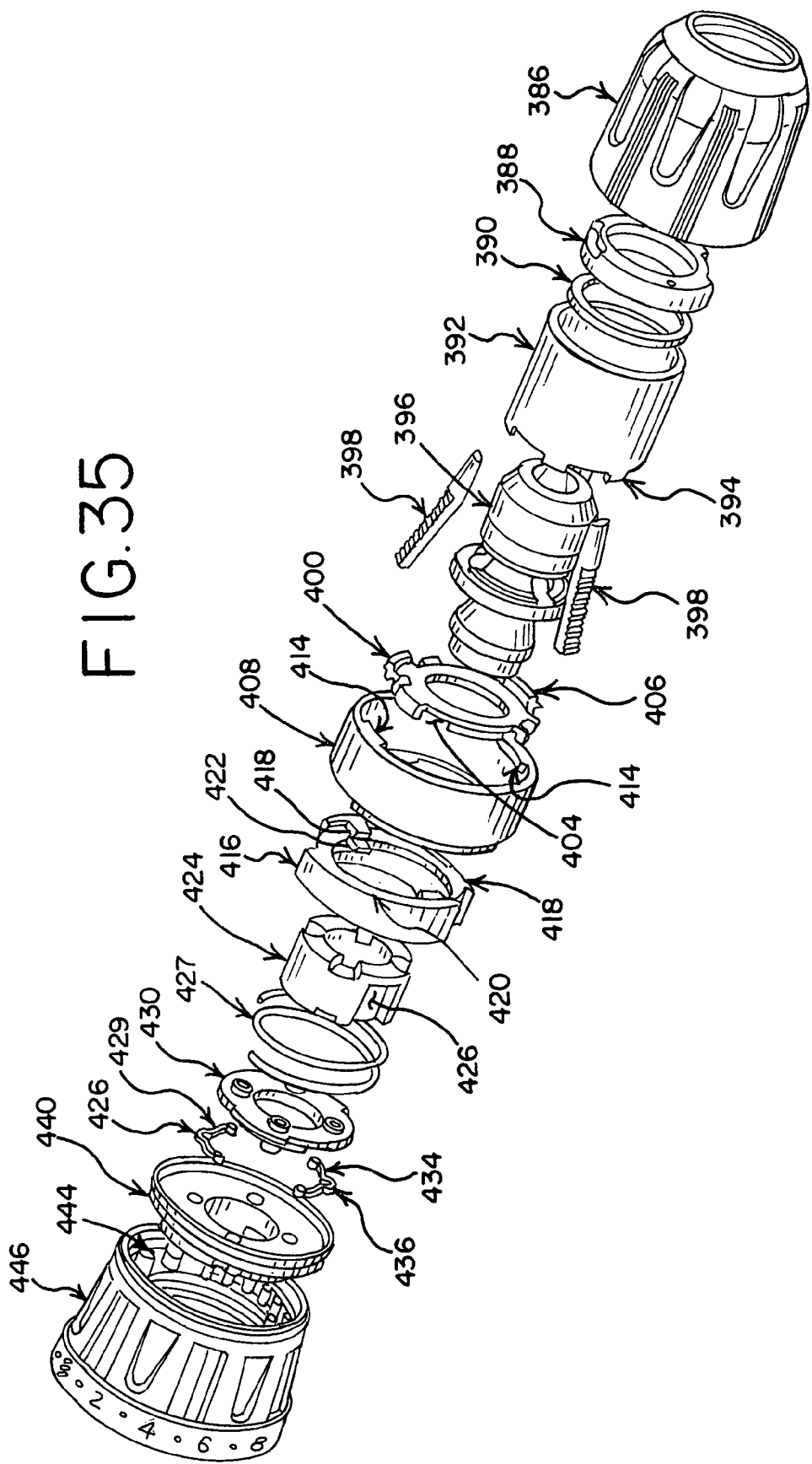
FIG. 35 is an exploded, perspective view of another embodiment of a chuck.
Figure 41:
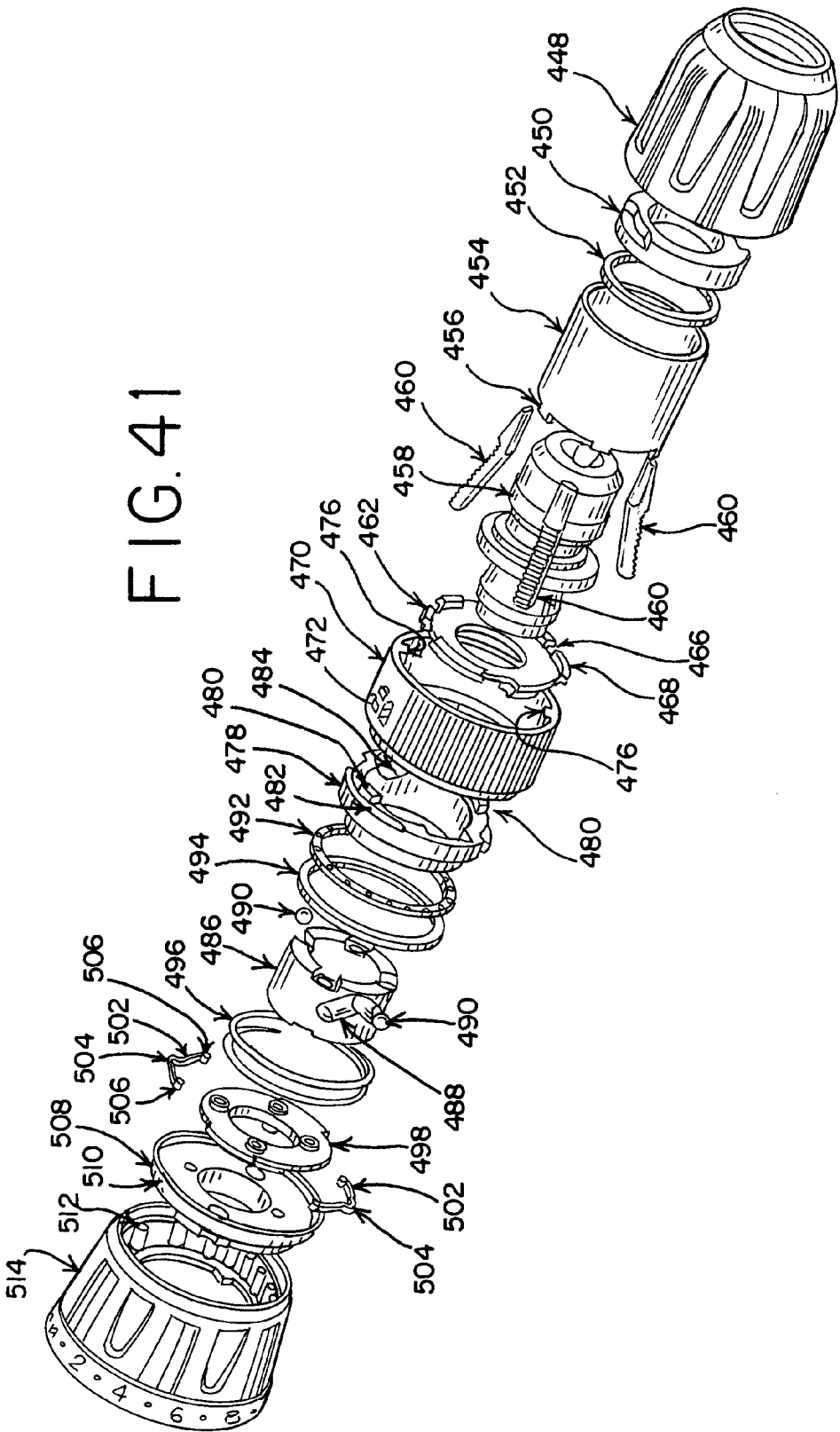
FIG. 41 is an exploded, perspective view of another embodiment of a chuck.
Figure 42:
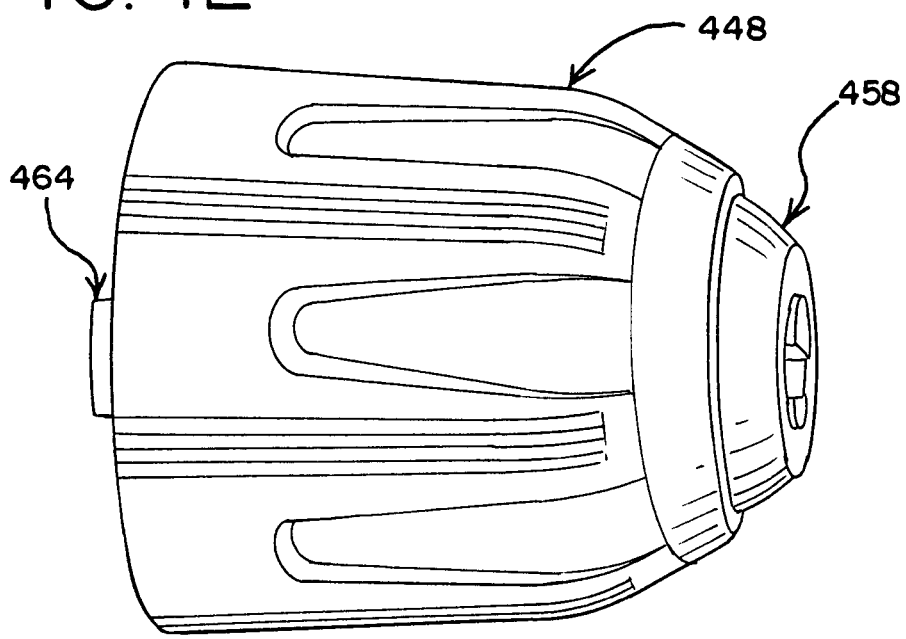
FIG. 42 is a side, perspective view of a portion of the chuck, showing an outer sleeve and an impact plate protrusion.
Figure 43:
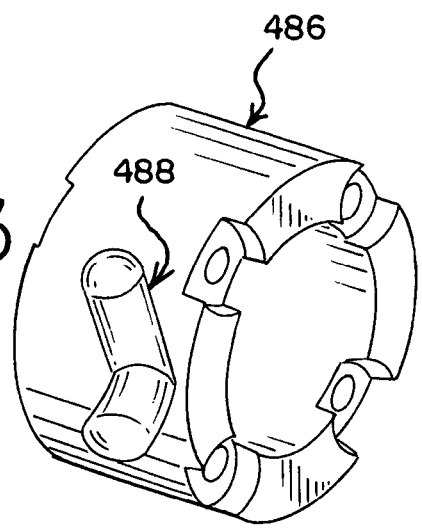
FIG. 43 is a front, perspective view of a joint member of the chuck.
Figure 44:
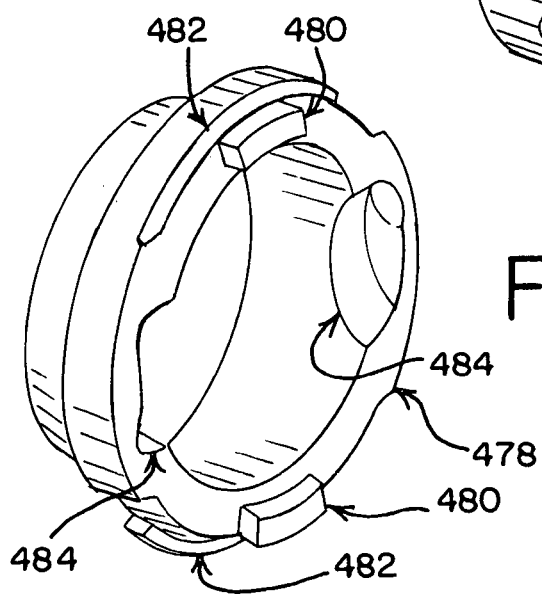
FIG. 44 is a front, perspective view of an impact member of the chuck.
Figure 48:
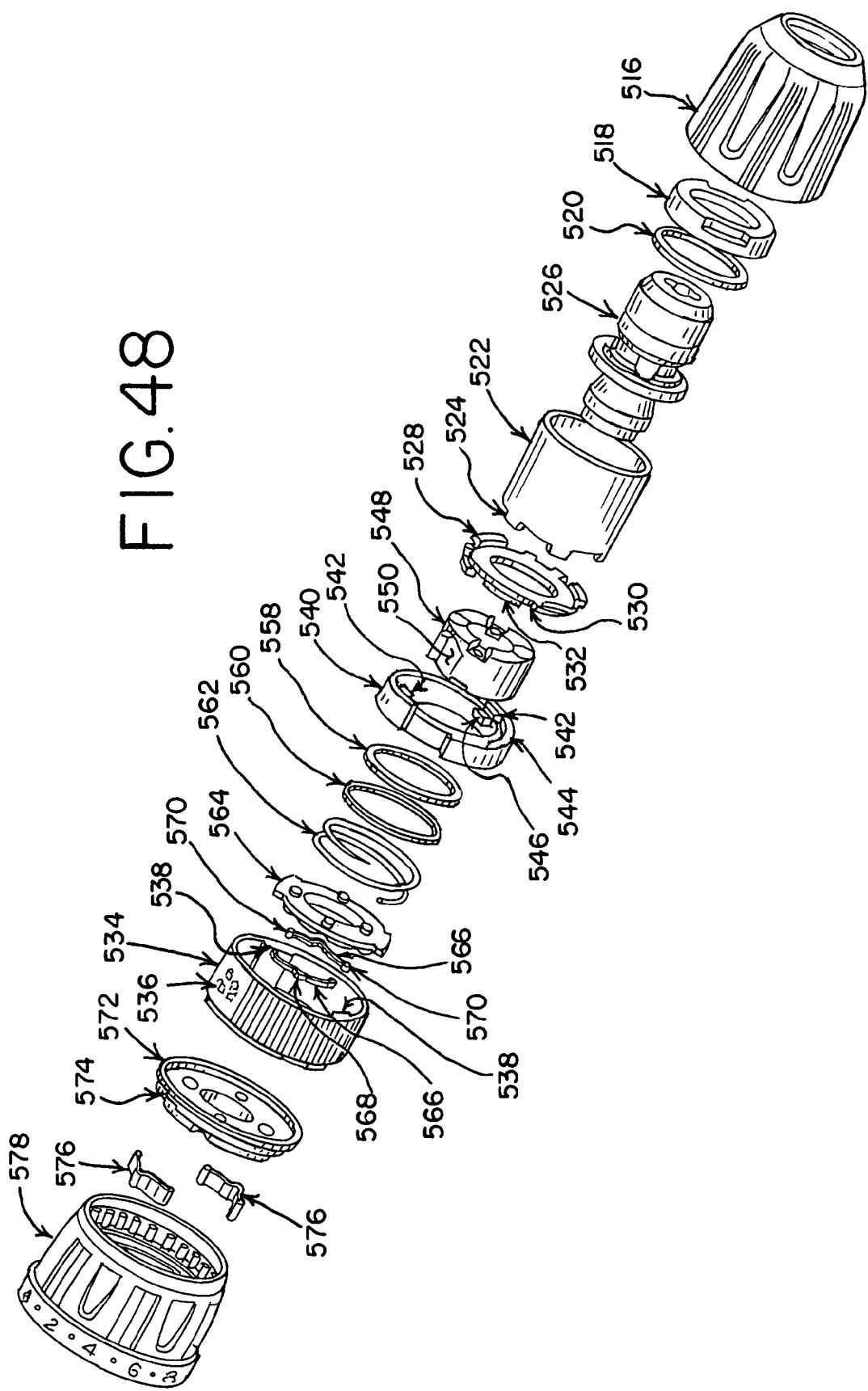
FIG. 48 is an exploded, perspective view of another embodiment of a chuck.

One difference between the chuck shown in FIGS. 41-47 and the chuck shown in FIG. 35 is that the impact member 478 moves rearward relative to the joint member 486 along V-shaped circumferential grooves 484, 488 in the impact member 478 and the joint member 486. As shown in FIG. 43, the apex of each V-shaped circumferential groove 488, or guide surface, in the joint member 486 points forward. As shown in FIG. 44, the apex of each V-shaped circumferential groove 484 in the impact member 478 points rearward. As shown in FIGS. 45 and 47, a ball 490 is installed between each pair of circumferential grooves 484, 488, thereby engaging the V-shaped circumferential groove 488 of the joint member 486 with the V-shaped circumferential groove 484 of the impact member 478.

The arrangement of the circumferential grooves 484, 488 and the inter-engaged balls 490 causes the impact member 478 to rotate and move rearward in one motion when the protrusions 464, 480 of the impact plate 462 and the impact member 478 impact against each other. Thus, the protrusions 480 of the impact member 478 rotate with the protrusions 464 of the impact plate 462 when contact occurs. When the protrusions 480 of the impact member 478 move rearward sufficiently so that the protrusions 464, 480 of the impact plate 462 and the impact member 478 are no longer engaged, the impact member 478 stops rotating and the impact plate protrusions 464 pass by the impact member protrusions 480. Once the impact plate protrusions 464 fully clear the impact member protrusions 480, the spring 496 forces the impact member 478 forward again along the circumferential grooves 484, 488. As a result, the impact member 478 rotates in reverse until the impact member 478 moves fully forward to its neutral position. The impact plate 462 and the impact member 478 repeatedly impact against each other in this manner as long as the body 458 continues to rotate and the locking sleeve 470 is positioned in the auto-lock/unlock mode.

Because the impact member 478 rotates relative to the spring 496 when it moves back-and-forth, it is preferred to include a washer 494 and a bearing 492 between the impact member 478 and the spring 496 to accommodate the relative rotation. In addition, as shown in FIGS. 42, 45 and 47, the protrusions 464, 480 of the impact plate 462 and the impact member 478 may have straight side surfaces since the V-shaped circumferential grooves 484, 488 prevent the impact plate 462 and the impact member 478 from locking against each other.

The auto-lock/unlock function may be stopped by rotating the locking sleeve 470, which causes the locking sleeve blocks 476 to rotate along the upward slope of the circumferential surfaces 482 of the impact member 478. This forces the impact member 478 to move rearward against the spring 496 along the V-shaped circumferential grooves 484, 488. As a result, the protrusions 464, 480 of the impact plate 462 and the impact member 478 disengage from each other, thereby preventing impacts when the body 458 rotates.

Referring now to FIGS. 48 through 53, another embodiment of a chuck is shown. The manner of operation and some of the features of the chuck shown in FIGS. 48-53 are similar to the embodiments described above. Therefore, it is unnecessary to repeat every similarity for a complete understanding.

The chuck shown in FIGS. 48-53 includes an outer sleeve 516, an outer sleeve retention recess (not shown), an adjustment ring 518, a bearing 520, an inner sleeve 522, inner sleeve tabs 524, a body 526, jaws (not shown), an impact plate 528, impact plate protrusions (not shown), impact plate slots 530, a retention rib 532, a locking sleeve 534, a locking sleeve indicator 536, detent recesses (not shown), locking sleeve blocks 538, an impact member 540, impact member protrusions 542, circumferential surfaces 544, impact member tabs 546, a joint member 548, joint member slots 550, slot guide surfaces 552, stop surfaces 554, angled guide surfaces 556, a bearing 558, a washer 560, a spring 562, a spring retainer 564, anchor slots (not shown), locking sleeve springs 566, detents 568, anchors 570, a spacer 572, an indicator 574, clutch sleeve springs 576, and a clutch sleeve 578.

Figure 49:
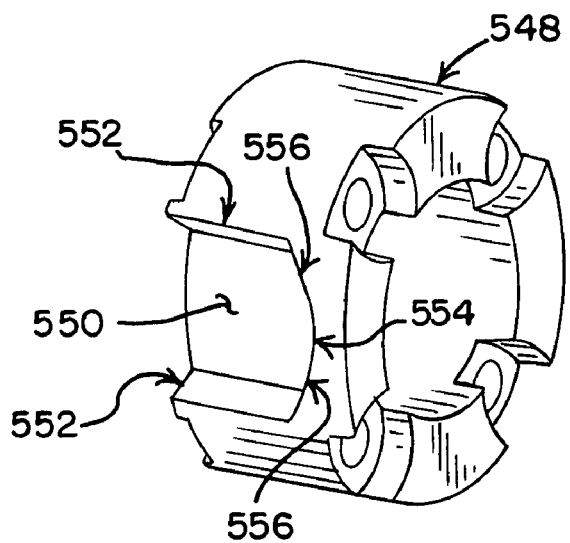
FIG. 49 is a front, perspective view of a joint member of the chuck.
Figure 50:
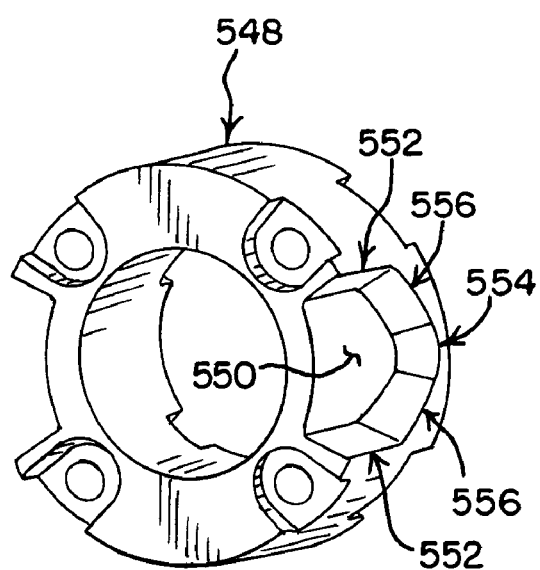
FIG. 50 is a rear, perspective view of the joint member of the chuck.
Figure 51:
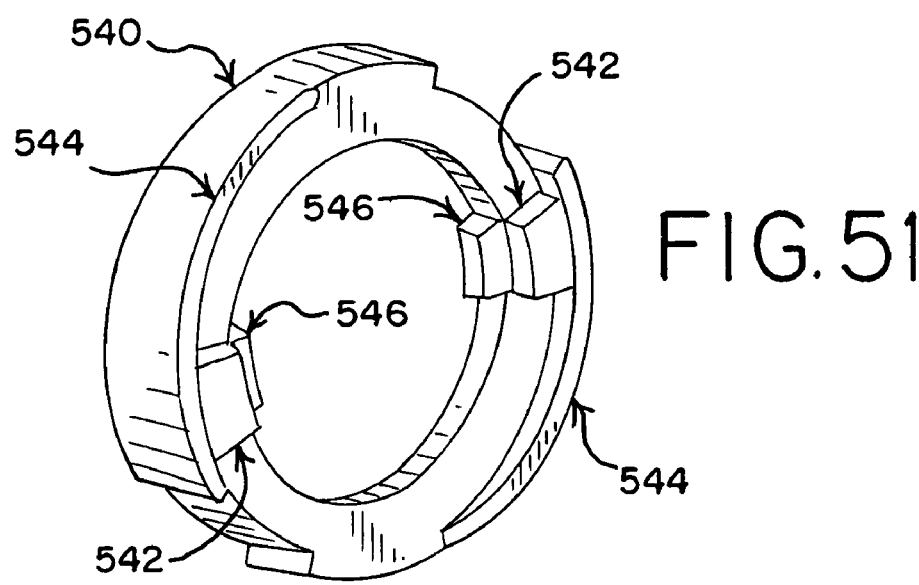
FIG. 51 is a front, perspective view of an impact member of the chuck.

One difference between the chuck shown in FIGS. 48-53 and the chucks shown in FIGS. 35 and 41 is that the impact member 540 moves rearward relative to the joint member 548 along wide slots 550 in the joint member 548. As shown in FIGS. 49-51, each of the slots 550 in the joint member 548 includes a stop surface 554, angled guide surfaces 556, and longitudinal guide surfaces 552. When assembled, the tabs 546 of the impact member 540 are installed within the joint member slots 550. However, the width of each joint member slot 550 is wider than the corresponding impact member tab 546. Thus, the impact member 540 may rotate relative to the joint member 548 between the opposing longitudinal guide surfaces 552 of the joint member slots 550. As a result, the impact member 540 moves rearward in a manner similar to the chuck shown in FIG. 41. However, because the circumferential grooves 484, 488 are not needed, the chuck shown in FIGS. 48-53 may be less expensive to manufacture.

In the forwardmost position, the impact member tabs 546 abut the stop surface 554 of the joint member 548. This allows the side surfaces of the impact plate protrusions (not shown) and the impact member protrusions 542 to impact when the body 526 rotates. When the protrusions of the impact plate 528 and the impact member 540 contact, the impact plate protrusions cause the impact member protrusions 542 to rotate. As the impact member 540 rotates, the impact member tabs 546 travel along the angled guide surfaces 556 of the joint member slots 550. This causes the impact member 540 to move rearward as it rotates with the impact plate 528. When the protrusions 542 of the impact member 540 move rearward sufficiently so that the protrusions of the impact plate 528 and the impact member 540 are no longer engaged, the impact member 540 stops rotating and the impact plate protrusions pass by the impact member protrusions 542. Once the impact plate protrusions fully clear the impact member protrusions 542, the spring 562 forces the impact member 540 forward again. As the impact plate 528 continues to rotate, the protrusions of the impact plate 528 and the impact member 540 repeatedly impact. Because the impact member 540 rotates when disengaging from the impact plate 528, the protrusions of the impact plate 528 and the impact member 540 may have straight sides as described above.

Figure 52:
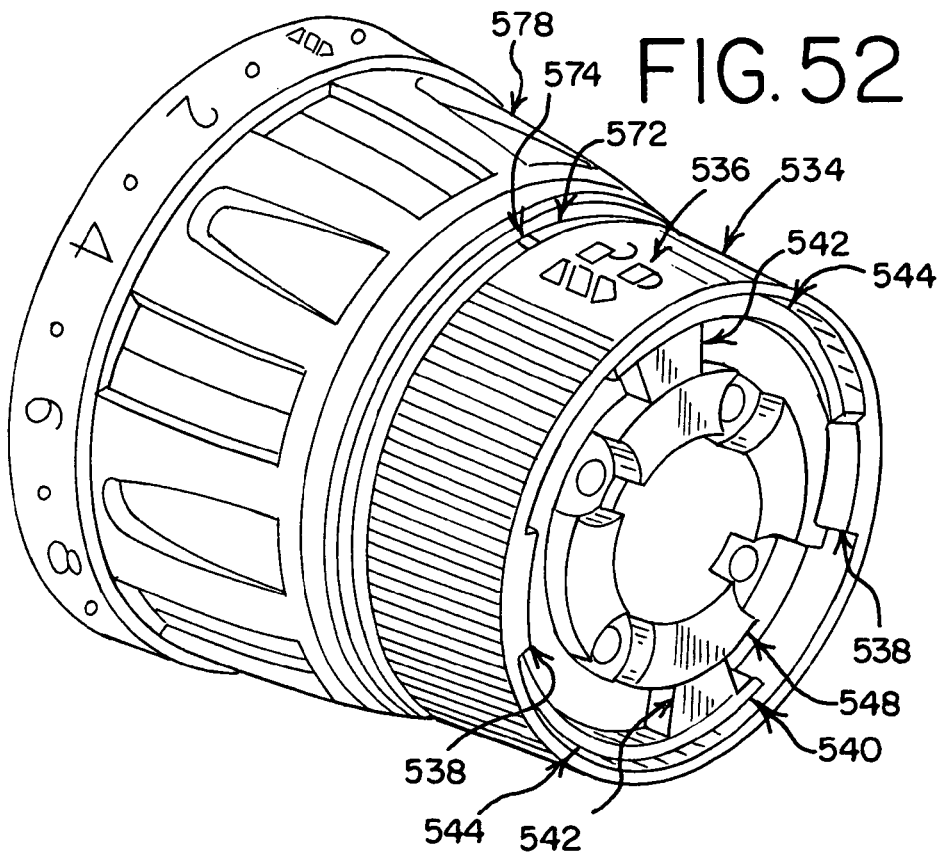
FIG. 52 is a front, perspective view of a portion of the chuck, showing the joint member, impact member and a locking sleeve assembled, with the locking sleeve rotated to engage the impact member.
Figure 53:
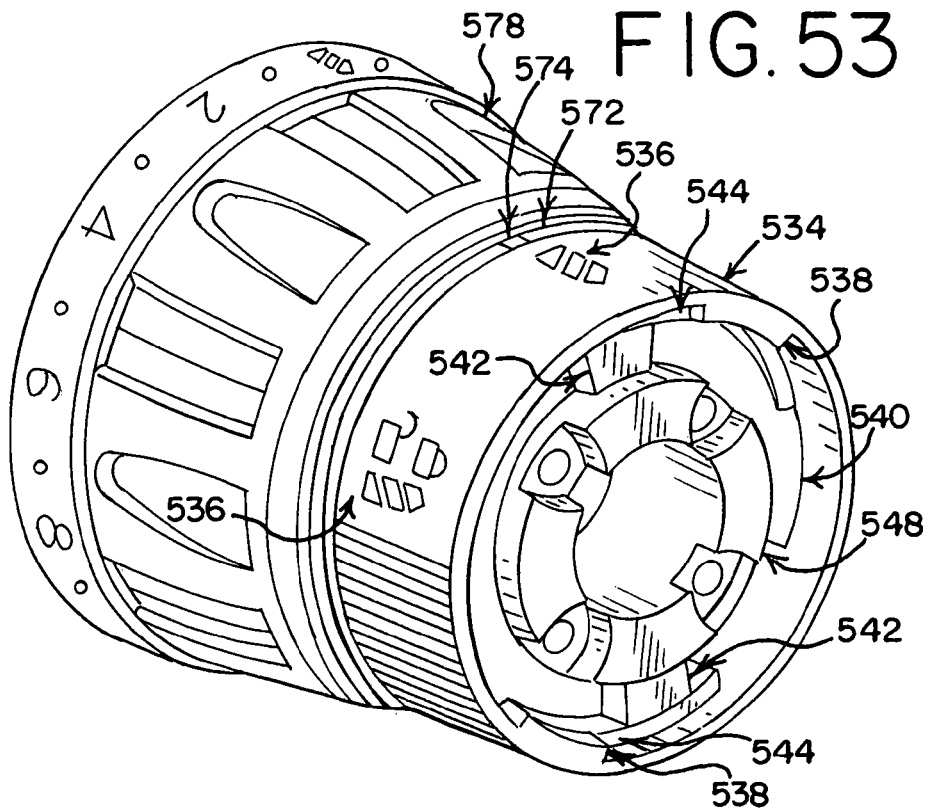
FIG. 53 is a front, perspective view of a portion of the chuck, showing the joint member, impact member and locking sleeve assembled, with the locking sleeve rotated to disengage the impact member.

As shown in FIGS. 52-53, the auto-lock/unlock function may be stopped by rotating the locking sleeve 534. This causes the locking sleeve blocks 538 to rotate along the upward slope of the impact member circumferential surfaces 544. As a result, the impact member 540 is forced rearward against the spring 562. Thus, the protrusions of the impact plate 528 and the impact member 540 disengage from each other to prevent impacts when the body 526 of the chuck rotates.

While preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

We claim:

1. A rotatable chuck for use with a power tool having a drive shaft, comprising:
   a body comprising a rear end adapted to be connected to a drive shaft of a power tool and a forward end adapted to receive a shaft of a work tool, said body thereby being rotatable in response to said drive shaft;

a plurality of jaws disposed within said forward end of said body and extending angularly from a longitudinal axis of said body, front ends of each of said jaws thereby being angled toward the other jaws, said jaws comprising jaw faces on inside surfaces of said front ends and threads being formed on outside surfaces of rear ends of each of said jaws;

an adjustment ring mounted about said body and threadably engaged with said jaws, said adjustment ring and said body being rotatable relative thereto;

a first protrusion connected to said adjustment ring and extending rearwardly therefrom, said first protrusion being rotatable with said adjustment ring;

a joint member adapted to be rotationally restrained relative to a frame of said power tool;

a guide surface disposed on said joint member and extending along a length of said joint member;

an impact member engaged with said guide surface of said joint member, said impact member thereby being axially moveable along said guide surface;

a second protrusion connected to said impact member and extending forwardly therefrom, said second protrusion being rotationally fixed to said impact member;

a spring disposed behind said impact member thereby biasing said first protrusion and said second protrusion into engagement;

wherein said first protrusion impacts said second protrusion when said drive shaft of said power tool is rotated, said impact member thereby restraining said adjustment ring relative to said body to adjust said jaws in response to rotation of said drive shaft, said second protrusion being disengaged from said first protrusion by rearward movement of said impact member; and wherein said guide surface comprises an angular surface of a slot, said impact member comprising a tab installed within said slot and a width of said slot being wider than said tab, wherein said impact member is rotatable along said angular surface relative to said joint member.

2. The rotatable chuck according to claim 1, further comprising a bearing disposed between said spring and said impact member.

3. The rotatable chuck according to claim 2, wherein said first protrusion and said second protrusion comprise generally straight longitudinal sides.

4. The rotatable chuck according to claim 3, wherein said first protrusion is connected to said adjustment ring with an inner sleeve fixedly attached to said adjustment ring, said inner sleeve being disposed within an outer sleeve and being generally cylindrical in shape and extending rearward from said adjustment ring.

5. The rotatable chuck according to claim 3, further comprising a locking sleeve, one of said locking sleeve and said impact member comprising a circumferential surface and the other comprising a block, an engagement between said circumferential surface and said block forcing said first protrusion and said second protrusion away from each other as said locking sleeve is rotated.

6. The rotatable chuck according to claim 5, further comprising a detent spring with anchors at opposing sides and a detent along a middle portion thereof, said anchors being disposed within anchor recesses in a spring retainer fixedly connected to said frame of said power tool, said detent engaging a detent recess in said locking sleeve, wherein said detent pops into said detent recess as said locking sleeve rotates thereby providing a sensory indication of a position of said locking sleeve.

7. The rotatable chuck according to claim 1, wherein said first protrusion is connected to said adjustment ring with an inner sleeve fixedly attached to said adjustment ring, said inner sleeve being disposed within an outer sleeve and being generally cylindrical in shape and extending rearward from said adjustment ring.

8. The rotatable chuck according to claim 7, wherein said adjustment ring is press fit into said inner sleeve and said first protrusion is formed integrally with an impact plate, said impact plate being fixedly and separably attached to said inner sleeve rearwardly from said adjustment ring.

9. The rotatable chuck according to claim 1, further comprising a locking sleeve, one of said locking sleeve and said impact member comprising a circumferential surface and the other comprising a block, an engagement between said circumferential surface and said block forcing said first protrusion and said second protrusion away from each other as said locking sleeve is rotated.

10. The rotatable chuck according to claim 9, further comprising an indicator rotationally fixed to said frame of said power tool, said indicator disposed between said locking sleeve and a clutch sleeve, said locking sleeve comprising a locking sleeve indicator, wherein said locking sleeve indicator rotates relative to said indicator as said locking sleeve rotates thereby providing a visible indication of a position of said locking sleeve.

11. The rotatable chuck according to claim 10, wherein said adjustment ring is press fit into said inner sleeve and said first protrusion is formed integrally with an impact plate, said impact plate being fixedly and separably attached to said inner sleeve rearwardly from said adjustment ring.

12. A rotatable chuck for use with a power tool having a drive shaft, comprising:

a body comprising a rear end adapted to be connected to a drive shaft of a power tool and a forward end adapted to receive a shaft of a work tool, said body thereby being rotatable in response to said drive shaft;

a plurality of jaws disposed within said forward end of said body and extending angularly from a longitudinal axis of said body, front ends of each of said jaws thereby being angled toward the other jaws, said jaws comprising jaw faces on inside surfaces of said front ends and threads being formed on outside surfaces of rear ends of each of said jaws;

an adjustment ring mounted about said body and threadably engaged with said jaws, said adjustment ring and said body being rotatable relative thereto;

a first protrusion connected to said adjustment ring and extending rearwardly therefrom, said first protrusion being rotatable with said adjustment ring;

a joint member adapted to be rotationally restrained relative to a frame of said power tool;

a guide surface disposed on said joint member and extending along a length of said joint member;

an impact member engaged with said guide surface of said joint member, said impact member thereby being axially moveable along said guide surface;

a second protrusion connected to said impact member and extending forwardly therefrom, said second protrusion being rotationally fixed to said impact member;

a spring disposed behind said impact member thereby biasing said first protrusion and said second protrusion into engagement;

wherein said first protrusion impacts said second protrusion when said drive shaft of said power tool is rotated, said impact member thereby restraining said adjustment ring relative to said body to adjust said jaws in response to rotation of said drive shaft, said second protrusion being disengaged from said first protrusion by rearward movement of said impact member;

wherein said first protrusion is connected to said adjustment ring with an inner sleeve fixedly attached to said adjustment ring, said inner sleeve being generally cylindrical in shape and extending rearward from said adjustment ring;

wherein said first protrusion is formed integrally with an impact plate, said impact plate being fixedly attached to said inner sleeve rearwardly from said adjustment ring; and wherein said impact plate is fixedly attached to said inner sleeve with tabs formed on a rearward end of said inner sleeve engaged in slots formed in said impact plate.

13. The rotatable chuck according to claim 12, wherein said guide surface comprises an angular surface of a slot, said impact member comprising a tab installed within said slot and a width of said slot being wider than said tab, wherein said impact member is rotatable along said angular surface relative to said joint member, further comprising a bearing disposed between said spring and said impact member, and wherein said first protrusion and said second protrusion comprise generally straight longitudinal sides.

14. The rotatable chuck according to claim 12, further comprising a locking sleeve, one of said locking sleeve and said impact member comprising a circumferential surface and the other comprising a block, an engagement between said circumferential surface and said block forcing said first protrusion and said second protrusion away from each other as said locking sleeve is rotated.

15. A rotatable chuck for use with a power tool having a drive shaft, comprising:
a body comprising a rear end adapted to be connected to a drive shaft of a power tool and a forward end adapted to receive a shaft of a work tool, said body thereby being rotatable in response to said drive shaft;
a plurality of jaws disposed within said forward end of said body and extending angularly from a longitudinal axis of said body, front ends of each of said jaws thereby being angled toward the other jaws, said jaws comprising jaw faces on inside surfaces of said front ends and threads being formed on outside surfaces of rear ends of each of said jaws;
an adjustment ring mounted about said body and threadably engaged with said jaws, said adjustment ring and said body being rotatable relative thereto;
a first protrusion connected to said adjustment ring and extending rearwardly therefrom, said first protrusion being rotatable with said adjustment ring;
a joint member adapted to be rotationally restrained relative to a frame of said power tool;
a guide surface disposed on said joint member and extending along a length of said joint member;
an impact member engaged with said guide surface of said joint member, said impact member thereby being axially moveable along said guide surface;
a second protrusion connected to said impact member and extending forwardly therefrom, said second protrusion being rotationally fixed to said impact member;
a spring disposed behind said impact member thereby biasing said first protrusion and said second protrusion into engagement;
wherein said first protrusion impacts said second protrusion when said drive shaft of said power tool is rotated, said impact member thereby restraining said adjustment ring relative to said body to adjust said jaws in response to rotation of said drive shaft, said second protrusion being disengaged from said first protrusion by rearward movement of said impact member; and further comprising a locking sleeve, one of said locking sleeve and said impact member comprising a circumferential surface and the other comprising a block, an engagement between said circumferential surface and said block forcing said first protrusion and said second protrusion away from each other as said locking sleeve is rotated.

16. The rotatable chuck according to claim 15, further comprising an indicator rotationally fixed to said frame of said power tool, said indicator disposed between said locking sleeve and a clutch sleeve, said locking sleeve comprising a locking sleeve indicator, wherein said locking sleeve indicator rotates relative to said indicator as said locking sleeve rotates thereby providing a visible indication of a position of said locking sleeve.

17. The rotatable chuck according to claim 15, further comprising a detent spring with anchors at opposing sides and a detent along a middle portion thereof, said anchors being disposed within anchor recesses in a spring retainer fixedly connected to said frame of said power tool, said detent engaging a detent recess in said locking sleeve, wherein said detent pops into said detent recess as said locking sleeve rotates thereby providing a sensory indication of a position of said locking sleeve.

18. The rotatable chuck according to claim 15, wherein said first protrusion is connected to said adjustment ring with an inner sleeve fixedly attached to said adjustment ring, said inner sleeve being disposed within an outer sleeve and being generally cylindrical in shape and extending rearward from said adjustment ring.

19. The rotatable chuck according to claim 18, wherein said adjustment ring is press fit into said inner sleeve and said first protrusion is formed integrally with an impact plate, said impact plate being fixedly and separably attached to said inner sleeve rearwardly from said adjustment ring.

20. A rotatable chuck for use with a power tool having a drive shaft, comprising:
a body comprising a rear end adapted to be connected to a drive shaft of a power tool and a forward end adapted to receive a shaft of a work tool, said body thereby being rotatable in response to said drive shaft;
a plurality of jaws disposed within said forward end of said body and extending angularly from a longitudinal axis of said body, front ends of each of said jaws thereby being angled toward the other jaws, said jaws comprising jaw faces on inside surfaces of said front ends and threads being formed on outside surfaces of rear ends of each of said jaws;
an adjustment ring mounted about said body and threadably engaged with said jaws, said adjustment ring and said body being rotatable relative thereto;
a first protrusion connected to said adjustment ring and extending rearwardly therefrom, said first protrusion being rotatable with said adjustment ring;
a joint member adapted to be rotationally restrained relative to a frame of said power tool;
a guide surface disposed on said joint member and extending along a length of said joint member;
an impact member engaged with said guide surface of said joint member, said impact member thereby being axially moveable along said guide surface;
a second protrusion connected to said impact member and extending forwardly therefrom, said second protrusion being rotationally fixed to said impact member;

a spring disposed behind said impact member thereby biasing said first protrusion and said second protrusion into engagement;

wherein said first protrusion impacts said second protrusion when said drive shaft of said power tool is rotated, said impact member thereby restraining said adjustment ring relative to said body to adjust said jaws in response to rotation of said drive shaft, said second protrusion being disengaged from said first protrusion by rearward movement of said impact member; and wherein said guide surface comprises an angular surface of a slot, said impact member comprising a tab installed within said slot and a width of said slot being wider than said tab, wherein said impact member is rotatable along said angular surface relative to said joint member, said first protrusion and said second protrusion comprising generally straight longitudinal sides, further comprising a bearing disposed between said spring and said impact member, and a locking sleeve, one of said locking sleeve and said impact member comprising a circumferential surface and the other comprising a block, an engagement between said circumferential surface and said block forcing said first protrusion and said second protrusion away from each other as said locking sleeve is rotated.

21. The rotatable chuck according to claim 20, wherein said first protrusion is connected to said adjustment ring with an inner sleeve fixedly attached to said adjustment ring, said inner sleeve being generally cylindrical in shape and extending rearward from said adjustment ring, said first protrusion is formed integrally with an impact plate, said impact plate being fixedly attached to said inner sleeve rearwardly from said adjustment ring, said adjustment ring being press fit into said inner sleeve.

22. The rotatable chuck according to claim 21, further comprising an indicator rotationally fixed to said frame of said power tool, said indicator disposed between said locking sleeve and a clutch sleeve, said locking sleeve comprising a locking sleeve indicator, wherein said locking sleeve indicator rotates relative to said indicator as said locking sleeve rotates thereby providing a visible indication of a position of said locking sleeve, and a detent spring engaged with a spring retainer fixedly connected to said frame of said power tool and said locking sleeve, said detent spring providing a sensory indication of a position of said locking sleeve.

* * * * *